(12) United States Patent
Hu et al.

(10) Patent No.: US 10,971,761 B2
(45) Date of Patent: Apr. 6, 2021

(54) INTERFACIAL LAYERS FOR SOLID-STATE BATTERIES AND METHODS OF MAKING SAME

(71) Applicant: University of Maryland, College Park, College Park, MD (US)

(72) Inventors: Liangbing Hu, Hyattsville, MD (US); Xiaogang Han, Hyattsville, MD (US); Eric D. Wachsman, Fulton, MD (US); Yifei Mo, Fulton, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 15/522,459

(22) PCT Filed: Oct. 28, 2015

(86) PCT No.: PCT/US2015/057824
§ 371 (c)(1),
(2) Date: Apr. 27, 2017

(87) PCT Pub. No.: WO2016/069749
PCT Pub. Date: May 6, 2016

(65) Prior Publication Data
US 2017/0338522 A1 Nov. 23, 2017

Related U.S. Application Data

(60) Provisional application No. 62/131,955, filed on Mar. 12, 2015, provisional application No. 62/069,748, filed on Oct. 28, 2014.

(51) Int. Cl.
*H01M 10/42* (2006.01)
*H01M 4/62* (2006.01)
(Continued)

(52) U.S. Cl.
CPC ..... *H01M 10/4235* (2013.01); *H01M 2/1673* (2013.01); *H01M 4/362* (2013.01);
(Continued)

(58) Field of Classification Search
CPC .... H01M 2/1673; H01M 4/362; H01M 4/381; H01M 4/382; H01M 4/386; H01M 4/466;
(Continued)

(56) References Cited

U.S. PATENT DOCUMENTS 5,342,710 A * 8/1994 Koksbang ............... H01M 4/02
429/310
5,434,021 A * 7/1995 Fauteux ................... H01M 4/13
429/213
(Continued)

FOREIGN PATENT DOCUMENTS

JP 60-001768 A 1/1985
JP 11-283664 A 10/1999
(Continued)

OTHER PUBLICATIONS

Ji et al., Fabrication of low-temperature solid oxide fuel cells with a nanothin protective layer by atomic layer deposition, Nanoscale Research Letters, vol. 8, No. 48, pp. 1-7. Jan. 23, 2013.
(Continued)

*Primary Examiner* — Sean P Cullen
(74) *Attorney, Agent, or Firm* — Ladas & Parry, LLP

(57) ABSTRACT

One or more interfacial layers in contact with a solid-state electrolyte and hybrid electrolyte materials. Interfacial layers comprise inorganic (e.g., metal oxides and soft inorganic materials) or organic materials (e.g., polymer materials, gel materials and ion-conducting liquids). The interfacial layers can improve the electrical properties (e.g., reduce the impedance) of an interface between an a cathode and/or anode and a solid-state electrolyte. The interfacial layers can be used in,
(Continued)

for example, solid-state batteries (e.g., solid-state, ion-conducting batteries).

23 Claims, 15 Drawing Sheets

(51) Int. Cl.
| | |
|---|---|
| *H01M 2/16* | (2006.01) |
| *H01M 4/38* | (2006.01) |
| *H01M 4/36* | (2006.01) |
| *H01M 4/583* | (2010.01) |
| *H01M 4/58* | (2010.01) |
| *H01M 10/052* | (2010.01) |
| *H01M 4/46* | (2006.01) |
| *H01M 10/0525* | (2010.01) |
| *H01M 10/0562* | (2010.01) |

(52) U.S. Cl.
CPC .......... *H01M 4/381* (2013.01); *H01M 4/382* (2013.01); *H01M 4/386* (2013.01); *H01M 4/466* (2013.01); *H01M 4/583* (2013.01); *H01M 4/5815* (2013.01); *H01M 4/62* (2013.01); *H01M 10/052* (2013.01); *H01M 10/0525* (2013.01); *H01M 10/0562* (2013.01); *H01M 2300/0068* (2013.01); *H01M 2300/0071* (2013.01)

(58) Field of Classification Search
CPC ...... H01M 4/5815; H01M 4/583; H01M 4/62; H01M 10/052; H01M 10/0525; H01M 10/054; H01M 10/0562
USPC .................................. 429/144, 304, 249, 251
See application file for complete search history.

(56) References Cited

U.S. PATENT DOCUMENTS

| | | | | |
|---|---|---|---|---|
| 9,252,455 | B1* | 2/2016 | Liu | H01M 4/382 |
| 2004/0191617 | A1 | 9/2004 | Visco et al. | |
| 2005/0008938 | A1* | 1/2005 | Cho | H01M 4/04 |
| | | | | 429/246 |
| 2007/0048617 | A1* | 3/2007 | Inda | C03C 4/18 |
| | | | | 429/304 |
| 2008/0118826 | A1* | 5/2008 | Shimamura | H01M 6/48 |
| | | | | 429/129 |
| 2008/0241665 | A1 | 10/2008 | Sano | |
| 2009/0061313 | A1 | 3/2009 | Tadano | |
| 2009/0197182 | A1* | 8/2009 | Katoh | H01M 4/1391 |
| | | | | 429/305 |
| 2010/0216032 | A1* | 8/2010 | Baba | H01M 4/366 |
| | | | | 429/322 |
| 2013/0260257 | A1* | 10/2013 | Choi | H01M 10/056 |
| | | | | 429/303 |
| 2013/0295469 | A1 | 11/2013 | Liang et al. | |
| 2013/0323603 | A1* | 12/2013 | Ryu | H01M 4/382 |
| | | | | 429/320 |
| 2014/0080006 | A1 | 3/2014 | Ogasa | |
| 2014/0272595 | A1* | 9/2014 | Cristadoro | H01M 10/654 |
| | | | | 429/231.95 |
| 2014/0287305 | A1* | 9/2014 | Wachsman | H01M 10/0562 |
| | | | | 429/211 |
| 2015/0064537 | A1* | 3/2015 | Christensen | H01M 10/0562 |
| | | | | 429/126 |
| 2015/0147659 | A1* | 5/2015 | Kato | H01M 10/0562 |
| | | | | 429/304 |
| 2015/0311562 | A1* | 10/2015 | Le Van-Jodin | H01M 10/0436 |
| | | | | 429/126 |

FOREIGN PATENT DOCUMENTS

| | | |
|---|---|---|
| JP | 2004-063397 A | 2/2004 |
| JP | 2009-054455 A | 3/2009 |
| JP | 2009181920 A | 8/2009 |
| JP | 2009-259696 A | 11/2009 |
| JP | 2010015782 A | 1/2010 |
| JP | 2014072009 A | 4/2014 |
| JP | 2014-096350 A | 5/2014 |
| WO | WO-2014010043 A1 * | 1/2014 ........ H01M 10/0562 |
| WO | 2013/140565 A1 | 8/2015 |

OTHER PUBLICATIONS

PCT International Search Report from PCT/US2015/057824 dated Jan. 19, 2016.
PCT International Preliminary Report of Patentability (Chapter 1) with Written Opinion from PCT/US2015/057824 dated May 2, 2017.
Extended European Search Report from EPO Patent Application No. 15855215.8 dated Apr. 23, 2018.
Office Action from EPO Patent Application No. 15855215.8 dated Jul. 5, 2019.
Office Action from Japanese Patent Application No. 2017-523916 dated Sep. 3, 2019, and its English translation.
Office Action from Japanese Patent Application No. 2017-523916 dated Jun. 2, 2020, and its English translation.
Official communication dated Jan. 15, 2021 from Japanese Patent Application No. 2017-523916.
Official communication dated Jan. 26, 2021 from Japanese Patent Application No. 2017-523916.

* cited by examiner (a)

(b)

(c)

INTERFACIAL LAYERS FOR SOLID-STATE BATTERIES AND METHODS OF MAKING SAME

CROSS-REFERENCE TO RELATED APPLICATIONS

This application claims priority to the provisional patent application filed Oct. 28, 2014 and assigned U.S. App. No. 62/069,748 and the provisional patent application filed Mar. 12, 2015 and assigned U.S. App. No. 62/131,955, the disclosures of which are hereby incorporated by reference.

STATEMENT REGARDING FEDERALLY-SPONSORED RESEARCH OR DEVELOPMENT

This disclosure was made with government support under DEAR0000384 awarded by the Department of Energy. The government has certain rights in the disclosure.

FIELD OF THE DISCLOSURE

This disclosure relates to interfacial layers for solid-state batteries. More particularly, the disclosure relates to interfacial layers between a cathode and/or anode and the solid-state electrolyte of a battery.

BACKGROUND OF THE DISCLOSURE

Solid-state lithium batteries (SSLiBs) provide potential solutions to the primary problems encountered in traditional lithium (Li)-ion batteries with flammable liquid electrolytes, such as poor safety, limited voltage, unstable solid-electrolyte interphase (SEI) formation, and poor cycling performance. Solid-state electrolytes (SSE) are the enabling material for the successful development of a variety of solid-state batteries, such as SSLiBs for electrical vehicle applications and solid state Na-ion batteries (SSNaBs) for large scale grid scale energy storage. A range of SSEs have been investigated, such as LiSICON, thio-LiSICON, perovskites, $LiBH_4$, sulfide-based glass/ceramic, Li-garnet for SSLiBs, and NASICON and beta-alumina for SSNaBs. Steady progress on the improvement of ion conductivity in SSEs has resulted in high conductivity of $10^{-2}$ S/cm in sulfide-base electrolyte, which rivals the conductivity of organic electrolytes. However, for full cell development, a stable interface with small interfacial impedance between SSE and electrodes is critical. A few approaches have been applied to reduce interfacial impedance between SSE and cathodes, including surface coating, interface softening, buffer layer, e.g., $LiNbO_2$, Nb, $BaTiO_3$, and an additive in cathode composite, e.g., LBO. The interface at the anode side, however, is rarely explored, especially when metal Li is used. It is likely due to the fact that many solid electrolytes including perovskite-type (Li, La)$TiO_3$, NASICON (especially Ti-based materials), and sulfide-based glass electrolytes are not stable against metallic Li. Given the fact that Li metal has the highest capacity (3860 mAh/g) and the lowest potential (−3.040 vs. standard hydrogen electrode) as an anode, solving the interface between SSE and Li metal anode is extremely critical for high energy density SSLiB development.

Among the variety of SSEs, garnet electrolytes are very attractive for SSLiBs because they (1) have a wide electrochemical window, are stable against Li metal and up to 6 V, and are unique from most other SSEs; (2) are environmentally stable with much processing flexibility; and (3) have high ionic conductivity, close to 1 mS/cm at room temperature. Since their discovery more than ten years ago, fundamental research has led to both increased understanding of the underlying mechanisms and improved Li-ion conductivity. However, there is still little progress on the successful demonstration of high performance SSLiBs with garnet SSE. The primary challenge is the large interface resistance between garnet electrolyte and electrode materials due to its rigid ceramic nature. Heating or even melting Li metal for its integration with garnet electrolytes was reported. However, the resistance reduction at the interface was limited, likely due to microscopic gaps existing at the interface and potential wetting issues. It was previously confirmed that $Li_2CO_3$ naturally formed on the garnet surface as a source of high interfacial resistance for LLZO with Li metal. After removing surface impurity by polishing, they successfully achieved a much lower interfacial area specific resistance (ASR), ~109 $\Omega \cdot cm^2$. Nevertheless, the achieved interfacial impedance is still too high for SSLiBs, and their polishing approach is only applicable to flat garnet electrolytes, significantly limiting cell geometries and manufacturing scalability.

Due to their intrinsic safety, SSLiBs could provide low-cost safe energy storage solutions for electrical vehicle, cell phone, and various other applications. However, SSLiB interfaces are typically planar resulting in high impedance due to low specific surface area, and attempts to make 3D high surface area interfaces can also result in high impedance due to poor contact (e.g., pores) at the electrode-electrolyte interface that hinders ion transport or degrades due to expansion/contraction with voltage cycling. The current state-of-art interfacial impedance in SSLiBs is ~1000 $\Omega/cm^2$, which is 100-1000 times higher than $Li^+$ batteries with organic electrolytes. Such high interfacial impedance not only limits the initial rate performance of SSLiBs, but also increases dramatically over charge-discharge cycling, greatly impacting the battery cycle life. Thus, grand challenges exist at the SSE-electrode interface, specifically: (1) large interfacial impedance for charge transfer and transport; and (2) mechanical degradation of interface with electrochemical charge/discharge cycles.

Further, challenges exist with SSEs that may explain the limited success in SSLiBs and SSNaBs. These challenges include: large interface resistance in the cells between electrode particle-electrolyte particle, between electrode particles, and between electrolyte particles; poor structure interface integrity during cycling as SSEs are typical fragile; and high processing temperature that is not compatible with most anode and cathode materials.

Therefore, there is a need for solid-state batteries with improved electrolyte-electrode interfacial impedance properties.

BRIEF SUMMARY OF THE DISCLOSURE

The present disclosure provides an inorganic or organic interfacial layer having a thickness of 1 nm to 100 nm in contact with on at least a portion of or a surface or all of the surfaces of a solid-state electrolyte (SSE) material. The inorganic interfacial layer can be a metal oxide selected from $Al_2O_3$, $TiO_2$, $V_2O_5$, $Y_2O_3$, and combinations thereof. The inorganic interfacial layer can be a soft inorganic material. The organic interfacial layer can be an ion-conducting organic material comprising: i) a polymer, ii) a gel material comprising one or more lithium salts and a polymer, or iii) a lithium salt and one or more solvents.

The SSE material can comprise one or more lithium-ion conducing SSE material selected from lithium perovskite materials, $Li_3N$, Li-β-alumina, Lithium Super-ionic Conductors (LISICON), $Li_{2.88}PO_{3.86}N_{0.14}$ (LiPON), $Li_9AlSiO_8$, $Li_{10}GeP_2S_{12}$, lithium garnet SSE materials, doped lithium garnet SSE materials, lithium garnet composite materials, and combinations thereof. The SSE material can comprise a sodium-ion conducing SSE material selected from β"-$Al_2O_3$, $Na_4Zr_2Si_2PO_{12}$ (NASICON), cation-doped NASICON, and combinations thereof. The SSE material can be a magnesium-ion conducing SSE material selected from $Mg_{1+x}(Al,Ti)_2(PO_4)_6$, NASICON-type magnesium-ion conducting materials, and combinations thereof.

The present disclosure also provides a device comprising one or more inorganic layer and/or organic interfacial layer. The device can be solid-state ion-conducting battery and can further comprise an SSE material, cathode material, and an anode material. The solid-state ion-conducting battery can be a lithium-ion conducting solid-state battery and the SSE material can be a lithium-ion conducting SSE material having one or more interfacial layer in contact with the lithium-ion conducting SSE material. The solid-state ion-conducting battery can be a sodium-ion conducting solid-state battery and the SSE material can be a sodium-ion conducting SSE material having one or more interfacial layer in contact with the sodium-ion conducting SSE material. The solid-state ion-conducting battery can be a magnesium-ion conducting solid-state battery and the SSE material can be a magnesium-ion conducting SSE material having one or more interfacial layer in contact with the magnesium-ion conducting SSE material.

For a lithium-ion conducting solid-state battery, the cathode material can be selected from a lithium-containing cathode materials, conducting carbon materials that, optionally, further comprise an organic or gel ion-conducting electrolyte, and polysulfide materials and/or the anode material is selected from lithium metal, silicon, conducting carbon materials that, optionally, further comprise an organic or gel ion-conducting electrolyte, and air. For a sodium-ion conducting solid-state battery, the cathode material can be selected from sodium-containing cathode materials, sulfur, sulfur composite materials, and polysulfide materials and/or the anode material is selected from ion-conducting, sodium-containing anode materials, sodium metal, tin, phosphorus, and air. For a magnesium-ion conducting solid-state battery, the cathode material can be a magnesium-containing cathode material and/or the anode material is magnesium metal.

The solid-state ion conducting battery may further comprise a cathode-side current collector and/or an anode-side current collector. In any solid-state, ion-conducting battery, the interfacial layer, the SSE material, ion-conducting cathode material, the ion-conducting anode material, and one or more of the current collectors can form a cell, and the solid-state, ion-conducting battery can comprise a plurality of the cells, each adjacent pair of the cells is separated by a bipolar plate.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the or scope of the disclosure.

The present disclosure provides interfacial layers disposed on (e.g., in physical contact with) solid-state electrolyte (SSE) materials. The present disclosure also provides methods of making such interfacial layers and devices comprising such interfacial layers. The present disclosure also provides hybrid electrolyte materials and methods of making such materials and devices comprising such materials.

Figure 9:
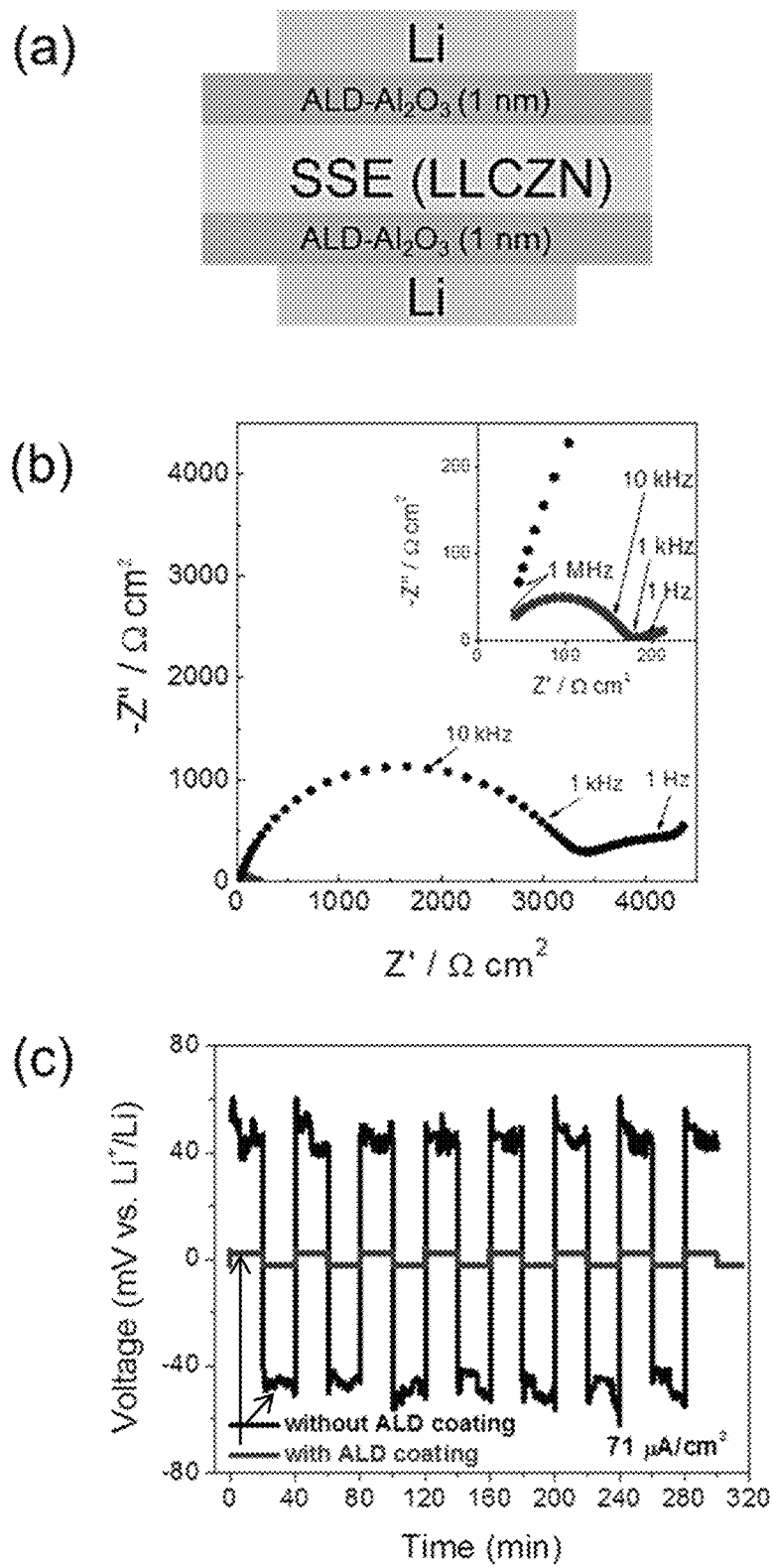
FIG. 9. Electrical properties of symmetric cells (Li/LLCZN/Li) with and without ALD coating. (a) Schematic of symmetric cell with 1 nm ALD-$Al_2O_3$ coating on LLCZN; (b) Nyquist plots for electrochemical impedance spectroscopy (EIS); (c, d, e) Galvanostatic cycling with a current density of 71, 157 and 300 μA/cm². (f) EIS of cell after and before plating/striping cycles. The dash line indicates DC ASR after long cycling. The inset in (b) is the magnified EIS at high frequency. The plating/stripping cycling for cell Li/LLCZN/Li without ALD coating is also shown in (c)
Figure 9:
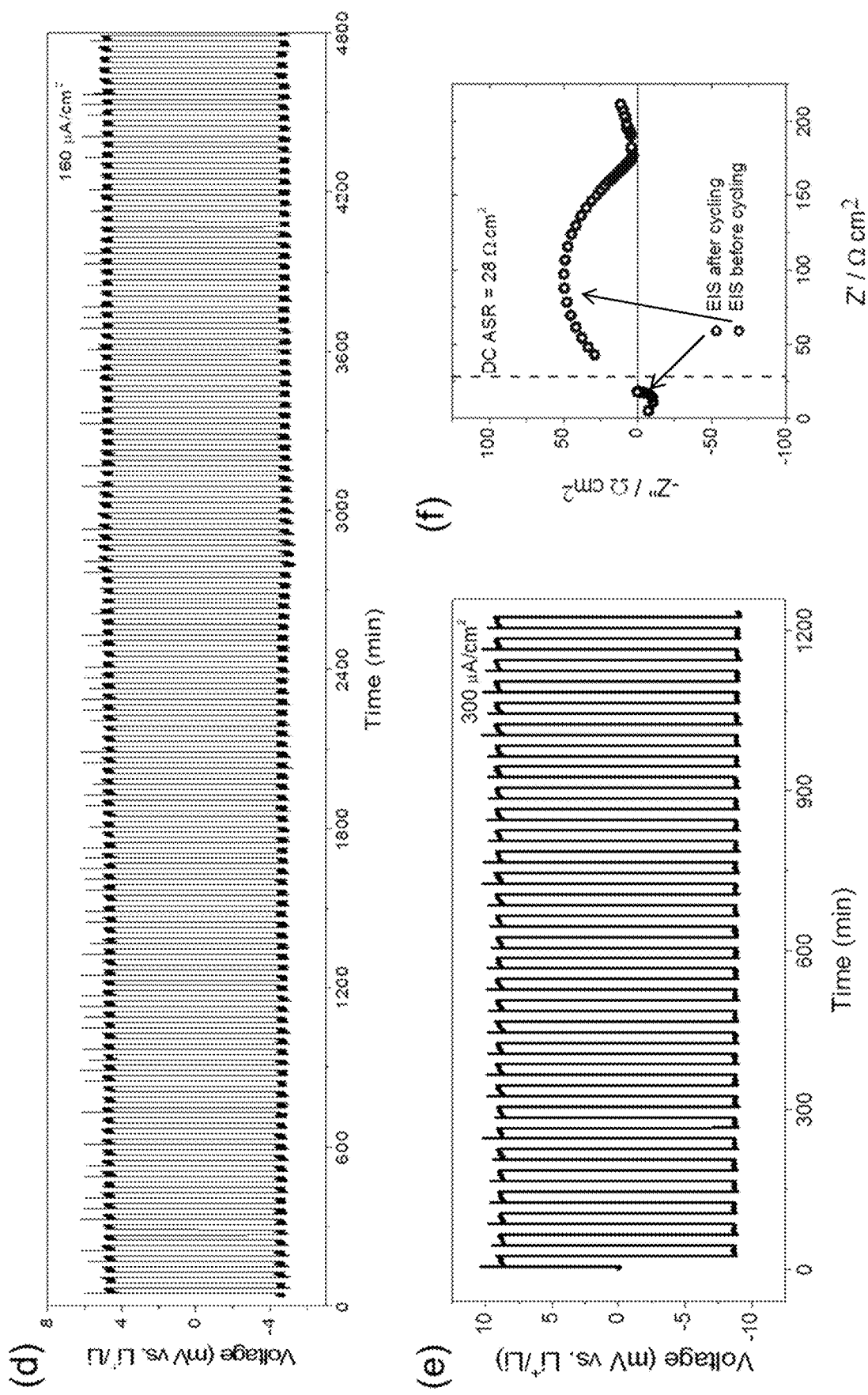

The present disclosure is based on the surprising and unexpected result that incorporation of an interfacial layer of the present disclosure can significantly reduce electrode-electrolyte interfacial resistance. As described herein (e.g., in Example 1 and FIG. 9) incorporation of an interfacial layer can result in a 300 fold decrease in interfacial resistance making solid state battery performance practical.

Figure 3:
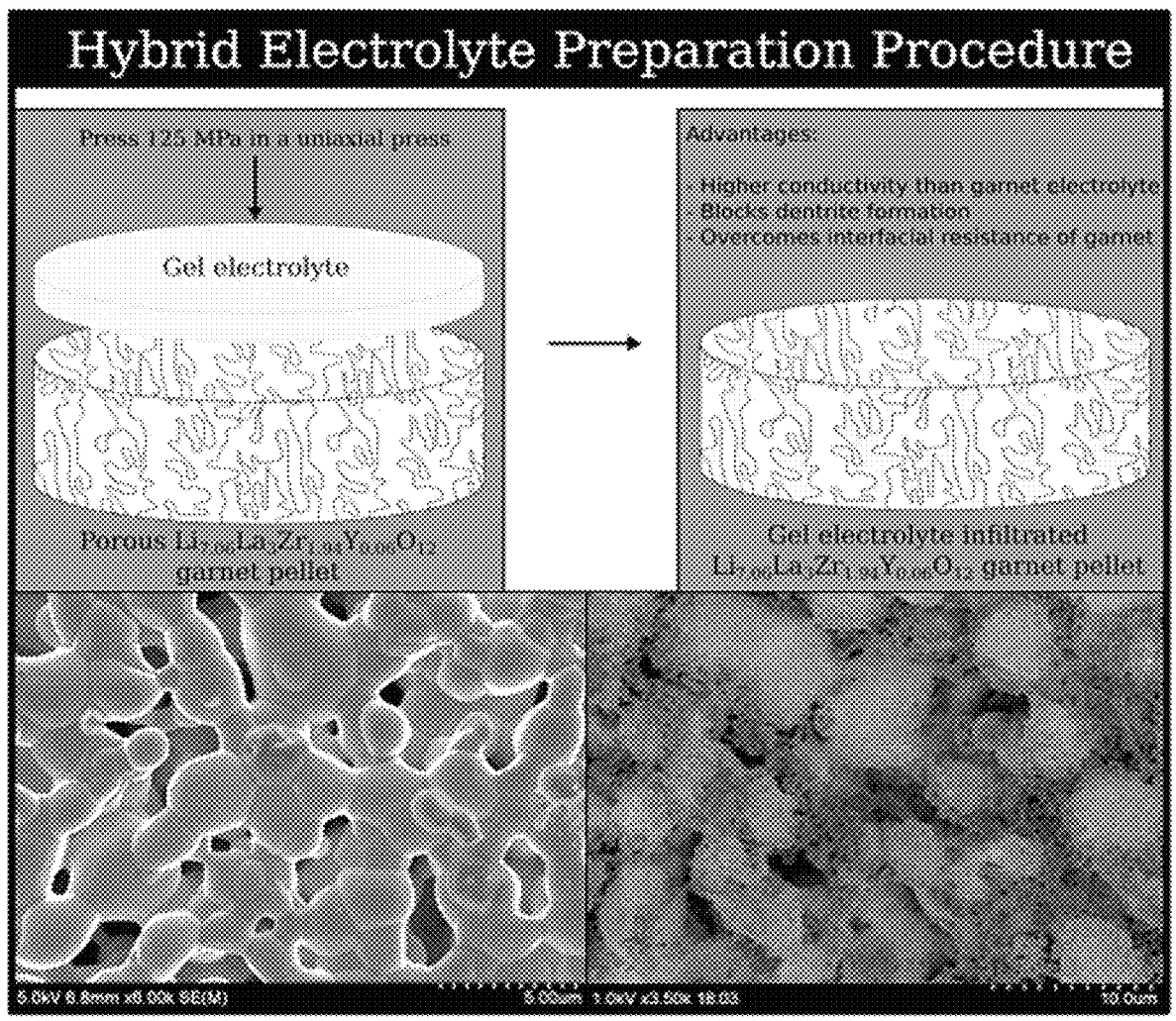
FIG. 3. (Schematic) Graphic of preparation procedure for gel electrolyte showing that a gel electrolyte is pressed into a porous garnet pellet, filling the pores. This is seen in the electron micrographs below showing the ~50% porosity garnet pellet (bottom left) before hybridization and the gel electrolyte-filled pores (bottom right) after hybridization.

The present disclosure includes, for example, two types of materials as interfacial layers in solid-state batteries:
1. Organic based polymer, gel, and liquid ion-conductors. These include, for example, nonflammable, organic electrolyte such as, for example, perfluoropolyethers (PFPE) based electrolytes. It has been confirmed that such organic electrolytes cannot catch fire and are intrinsically safe. PFPE based organic electrolyte can increase the interfaces across electrolyte grain boundaries, or an electrolyte-electrode interface for enhancing, for example, battery performance. PFPE based electrolytes can, for example, support the lithium ion chemistry. Such PFPE-based electrolytes also have a much higher Li$^+$ transference number than regular electrolytes that favor Li ion battery operation. The transference numbers are close to 1, similar to SSE. PFPE-based electrolytes significantly improve the solid-solid contact, especially when volume changes occurs during the device operations. For example, PFPEs are functionalized to form methylcarbonate-terminated PFPEs (PFPE-DMCs). Functionalized PFPEs remain as liquids over a large temperature range and exhibit low toxicity. It was found that PFPE-DMSs can solvate, for example, the well-known bis(triflo-romethane)sulfonamide lithium salt (LiTFSI). It is the first time that nonflammable non-aqueous electrolytes are used as the interfacial layer in SSLiBs. Another example is a polymer electrolyte or gel electrolyte, such as, for example, LiClO$_4$ in poly(ethylene oxide) (PEO) or polyvinylidene fluoride (PVDF). These soft electrolytes can improve the contacts between electrodes and electrolytes toward better charge transport and mechanical integrity. Gel electrolytes are highly elastic, can coat electrode or SSE surfaces conformally, and fill in the SSE to form a dense, pin-hole free membrane (FIG. 3). For example, a gel-electrolyte infiltrated in garnet powder can largely increase the overall ion conductivity. For example, a gel polymer electrolyte can be prepared as follows. 0.25 g PVDF-HFP is dissolved in 4.75 g acetone under robust stirring for 1 hour. Then the solution is cast on a glass slide and the solvent is evaporated before turning into a gel polymer film. The viscose gel electrolyte can be applied to an electrode or garnet electrolyte and dried later. Filling of gel electrolyte in garnet or electrode composites can be done by vacuum filtration.

Figure 1:
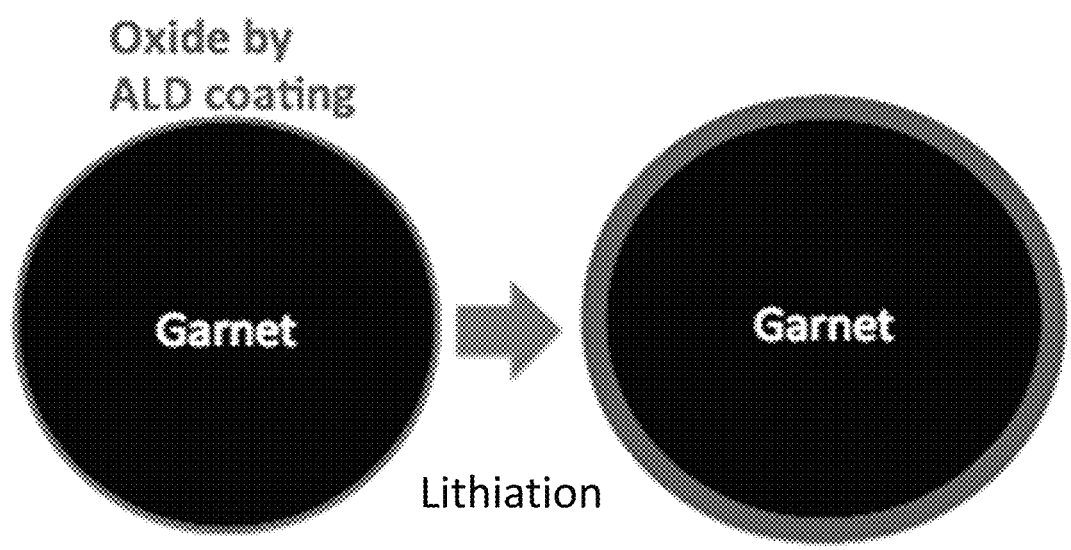
FIG. 1. Ultrathin ALD $Al_2O_3$, after lithiation and sodiation, can conduct Li and Na ions, respectively, to decrease interfacial impedance and can also expand-shrink together with the electrodes.
Figure 4:
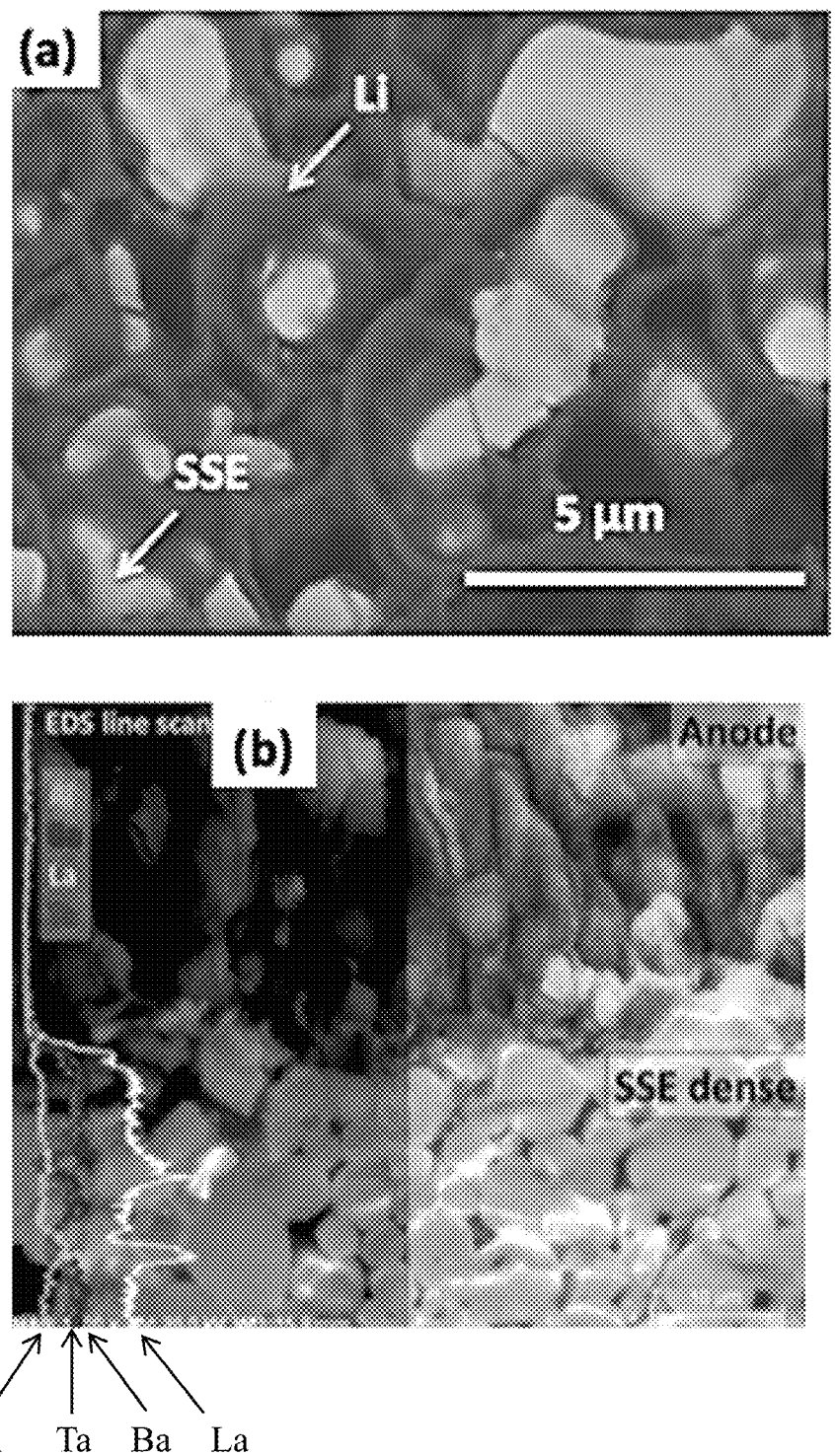
FIG. 4. (a) Cross-sectional SEM of a porous SSE sample after ALD $Al_2O_3$ coating and Li metal infiltration. (b) Cross sectional SEM and EDS at a Li-metal-dense SSE interface. Images demonstrate that desirable Li wetting of SSE was obtained.
Figure 5:
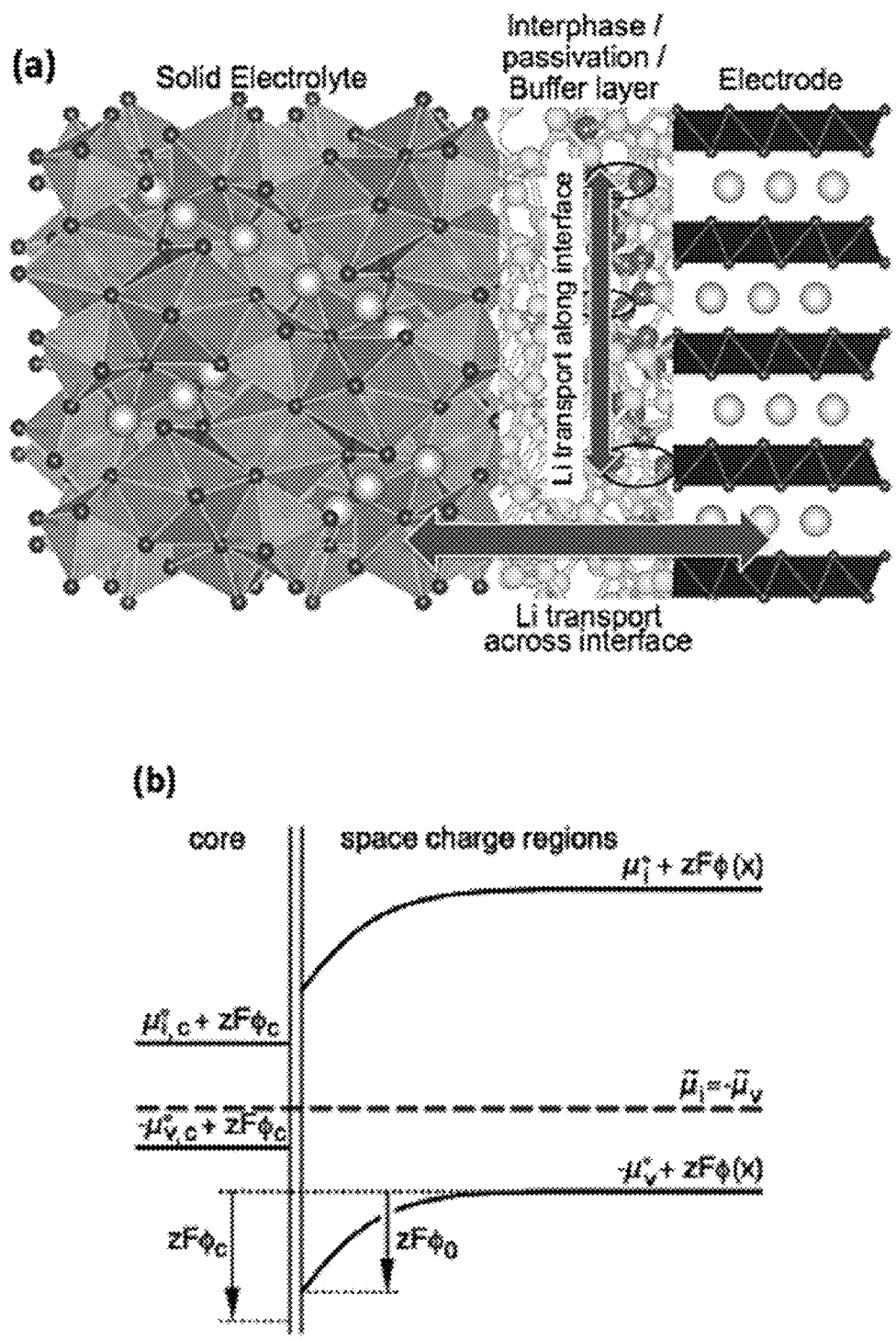
FIG. 5. (a) Schematic atomistic model to study interfacial ionic diffusion. (b) The meso-scale space-charge model for the interfacial electrostatic potential.
Figure 8:
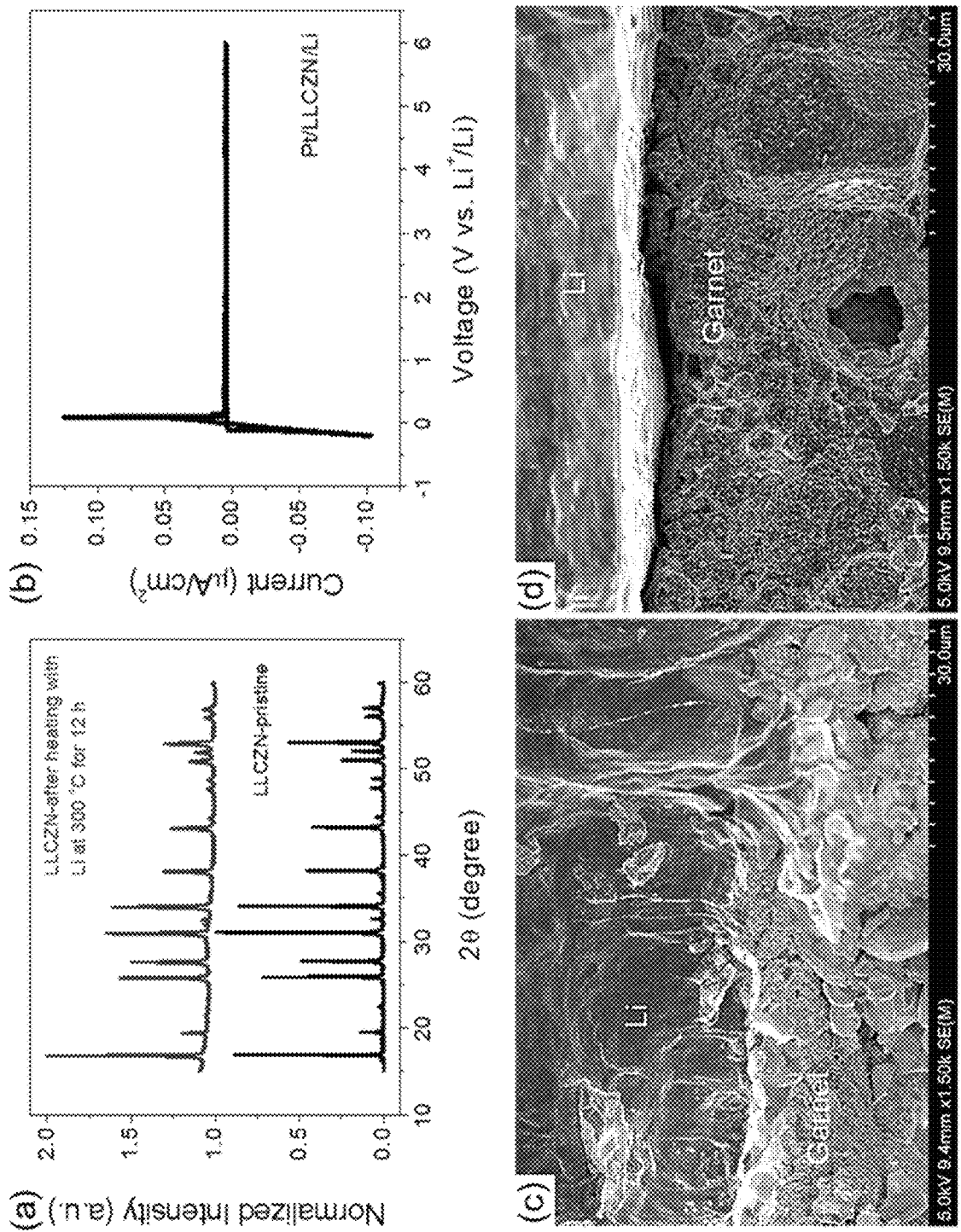
FIG. 8. Stability and SEM observations of the garnet/Li metal interface. (a) XRD pattern comparison for LLCZN powder before and after heating with Li powder at 300° C. for 12 hours. (b) Cyclic voltammetry of the LLCZN with Pt as the working electrode and Li metal as the reference and counter electrodes. The scan rate is 1.0 mV/s. (c, d) Cross-section SEM images for LLCZN/Li with (c) and without (d) ALD-$Al_2O_3$ coating on the LLCZN pellet, respectively.

2. Inorganic-based solid-state interface materials. For example, ALD ultra-thin oxides that becomes ionically conductive and mechanically ductile after lithiation are used as interface materials. Electrochemically reacted Al$_2$O$_3$ is ductile and ionically conductive, and improves the electrode-electrolyte interface. Metal oxides such as, for example, TiO$_2$ and Al$_2$O$_3$ become a desirable interfacial layer after lithiation. These oxides can be lithiated due to the small thickness even though they are electrically insulating. For example, ultra-thin oxides deposited by atomic-layer-deposition (ALD) can effectively conduct Li and Na ions, are highly elastic and ductile, and can coat electrode particles conformally (FIG. 1). For example, the oxide, after electrochemical reaction of the first half cycle, can expand up to 280% without any cracking or breakage. Additionally, ALD deposited Al$_2$O$_3$ can effectively improve the wetting between Li metal and the garnet electrolyte. For example, ultrathin (1-2 nm) conformal ALD Al$_2$O$_3$ can effectively increase the wetting and penetration of metal lithium into porous garnet electrolytes (see, e.g., FIG. 4 and FIG. 8). Soft ion-conducting solids can improve the contacts and cycling performance with desirable mechanical ductility and conductivity also can be used. For example, β-Li$_3$PS$_4$ (LPS) is softer than garnet. Soft LPS sulfide can be used as a nano-glue interfacial layer on hard oxide garnet. Calculations showed that small amounts of LPS can improve the charge transport between garnet particles. For example, LPS can be applied to SSE materials such as garnet by dry milling, or LPS-garnet composite can be synthesized by mixing the precursors together. It is expected that a composite with 95% garnet and 5% LPS will have desirable processibility, an electrochemical stable window, and high ion conductivity.

In an aspect, the present disclosure provides interfacial layers. An interfacial layer is in contact with at least a portion of a solid-state electrolyte material. An interfacial layer can comprise an organic material or an inorganic material. Without intending to be bound by any particular theory, it is considered that the interfacial layers decrease the impedance of an electrode-solid-state electrolyte interface by improving the wetting of the electrode to the electrolyte surface, ionic transport across that interface, structural integrity during cycling, or a combination thereof.

Interfacial layers are ion-conducting (e.g., mono-, di-, or tri-valent ion conducting). For example, an interfacial layer is lithium-ion conducting, sodium-ion conducting, magnesium-ion conducting, or aluminum-ion conducting. It is desirable that the interfacial layers are ion-conducting as formed or become ion-conducting after formation of the interfacial layer. For example, certain interfacial layers, e.g., metal oxide layers, become ion-conducting after lithiation or sodiation after exposure to the Li or Na anode, respectively.

Interfacial layers can prevent formation of a detrimental material on a surface of an SSE. For example, an interfacial layer prevents formation of a detrimental material, e.g., Li$_2$CO$_3$, that reduces or prevents ion-transport between an electrode and SSE.

At least a portion of a surface of an interfacial layer is in contact with at least a portion of a surface of an SSE material. An interfacial layer can contact all (e.g., a continuous layer) or substantially all of the surfaces of an SSE material. It is desirable that the interfacial layer is in contact with a portion of or the portions of the surface of the SSE material between the SSE material and an electrode material (e.g., a cathode material and/or an anode material). An interfacial layer in contact with a portion of the SSE material between the SSE material and the cathode (e.g., a soft ion-conducting inorganic material interfacial layer or ion-conducting organic material interfacial layer) can be different than the interfacial layer in contact with a portion of the SSE material between the SSE material and the anode (e.g., a metal oxide interfacial layer). For example, an interfacial layer in contact with a portion of the SSE material between the SSE material and the cathode is a soft ion-conducting inorganic material interfacial layer or ion-conducting organic material interfacial layer and the interfacial layer in contact with a portion of the SSE material between the SSE material and the anode is a metal oxide interfacial layer. SSE material can have at least a cathode portion and an anode portion. The cathode material is disposed on the cathode portion of the SSE and the anode portion is disposed on the anode portion of the SSE. The cathode portion and anode portion of the SSE can each have a discrete interfacial layer and the individual interfacial layers can be the same or different.

Interfacial layers can have a range of thickness. An interfacial layer can have a thickness of 1 nm to 100 nm, including all integer nm values and ranges therebetween.

An inorganic interfacial layer can comprise a metal oxide. For example, an interfacial layer is a metal oxide. Examples of metal oxides include, but are not limited to, $Al_2O_3$, $TiO_2$, $V_2O_3$, and $Y_2O_3$. Such metal oxide interfacial layers can be referred to as hard interfacial layers. A metal oxide interfacial layer can be formed by methods known in the art. For example, a metal oxide layer is formed by physical deposition methods (e.g., sputtering) or chemical vapor deposition methods (e.g., atomic layer deposition (ALD)), or solution based methods (e.g., sol-gel methods).

An inorganic interfacial layer can comprise a soft inorganic material. For example, an inorganic interfacial layer is a soft inorganic material. Soft inorganic materials can be ion-conducting materials. Soft inorganic materials can be intrinsically conducting. Without intending to be bound by any particular theory, it is considered that soft inorganic materials can improve the contacts between electrodes and electrolytes and improve charge transport and mechanical integrity. Examples of soft inorganic materials include, but are not limited to, β-$LiPS_4$ (LPS), $Li_{10}GeP_2S_{12}$, $Li_{3.25}Ge_{0.25}P_{0.75}S_4$, glass ceramics such as $Li_2P_3S_{11}$, and glassy materials such as $Li_2S$—$SiS_2$—$Li_3PO_4$. For example, sulfide-based soft-inorganic materials (e.g., sulfide-based solid-state electrolyte materials) are softer than garnet (e.g., LPS can be used as an interfacial layer for garnet based SSLiBs). A soft inorganic material can form a discrete layer on a SSE material.

An organic interfacial layer can comprise an ion-conducting organic material (e.g., a polymer and/or an organic solvent) and, optionally, an ionic salt (e.g., a Li salt, Na salt, etc.). Such organic interfacial layers can be referred to as soft interfacial layers. It is desirable that the ion-conducting organic materials are also electrically conducting. For example, the organic interfacial layer comprises a polymer (e.g., poly(ethylene oxide) (PEO)), a fluoropolymer such as polyvinylidene fluoride, a perfluoropolyether (PFPE), or functionalized analogs thereof (e.g., methylcarbonate-terminated PFPEs), and copolymers (e.g., poly(vinylidenefluoride-co-hexafluoropropylene). The ionic salts are soluble in the polymer. The polymer may further comprise a solvent (e.g., an organic solvent).

In another example, an organic interfacial layer comprises a gel material. A gel material can be an ion-conducting gel material. A gel material can comprise one or more metal-ion conducting (e.g., $Li^+$ conducting, $Na^+$ conducting, and/or $Mg^+$ conducting) polymer and/or copolymer and/or metal-ion (e.g., $Li^+$, $Na^+$, and/or $Mg^+$) host polymer and/or copolymer and one or more one or more ionic salt (e.g., a Li salts, Na salts, Mg salts, etc.). Host polymers and copolymers can solubilize a metal-ion/ionic salt. Examples of polymers include, but are not limited to, poly(ethylene oxide) (PEO)), fluoropolymers such as polyvinylidene fluoride, a perfluoropolyether (PFPE), or functionalized analogs thereof (e.g., methylcarbonate-terminated PFPEs) and examples of copolymers include, but are not limited to, poly(vinylidenefluoride-co-hexafluoropropylene. For example, the salt(s) is/are a lithium salt(s) (e.g., $LiPF_6$, $LiClO_4$, bis(trifluoromethane)sulfonamide lithium salt, and combinations thereof). The ionic salt(s) (e.g., a Li salt, Na salt, etc.) can be present at a range of compositions. For example, the ionic salt(s) is present at 1 to 20 weight percent (based on the total polymer and ionic salt(s) present), including all 0.1 values and ranges therebetween.

In yet another example, an organic interfacial layer can comprise an ion-conducting liquid comprising one or more solvents (e.g., organic solvents such as ethylene carbonate (EC), diethylcarbonate (DEC), fluorinated solvents (e.g., fluoroethylene carbonate (FEC), methyl trifluoroethyl carbonate (FEMC), hydrofluoroethers (HFEs)), and combinations thereof) and one or more ionic salt (e.g., a Li salts, Na salts, etc.). For example, the salt(s) is/are a lithium salt(s) (e.g., $LiPF_6$, $LiClO_4$, bis(trifluoromethane)sulfonamide lithium salt, and combinations thereof). For example, the ionic salt(s) is present at 1 to 20 weight percent (based on the total polymer and ionic salt(s) present), including all 0.1 values and ranges therebetween.

Soft ion-conducting inorganic materials and organic materials (e.g., a polymer material, gel material, or ion-conducting liquid) are soft materials. By soft it is meant that these materials are compressible such that they can fill voids (e.g., created by SSE surface features) to provide a continuous ionic-conduction pathway between an electrode material and SSE material. These soft interfacial layers are also, typically, more ductile to allow electrode volume change during cycling without structural failure.

An interfacial layer can be a discrete layer comprising a single inorganic interfacial layer material or a single organic interfacial layer material. An interfacial layer can comprise one or more discrete layers of inorganic interfacial layer material(s) and/or organic interfacial layer material(s). An interfacial layer can be a discrete layer comprising one or more inorganic interfacial layer material(s) and/or organic interfacial layer material(s).

It is desirable that an interfacial layer is pin-hole free. The interfacial layer can be free from observable pin holes. Pin-holes can be observed directly or indirectly by methods known in the art. For example, pin holes can be directly observed by imaging methods (e.g., optical imaging, SEM imaging, and/or TEM imaging) and/or indirectly by electrical property measurement (e.g., resistance or resistivity).

Any SSE material can be used. Suitable SSE materials are known in the art. Suitable SSE materials are commercially available and can be made by methods known in the art.

SSE material can be a lithium-ion conducting material. For example, an SSE material comprises porous or dense lithium-ion conducing SSE material. Examples of lithium-ion conducting SSE materials include, but are not limited to, lithium perovskite materials (e.g., $Li_{0.36}La_{0.55}\square 0.09TiO_3$ ($\square$=vacancy)), $Li_3N$ (e.g., layered $Li_3N$), Li-β-alumina, Lithium Super-ionic Conductors (LISICON) (e.g., $Li_{14}ZnGe_4O_{16}$,), $Li_{2.88}PO_{3.86}N_{0.14}$ (LiPON), $Li_9AlSiO_8$, $Li_{10}GeP_2S_{12}$, and lithium garnet SSE materials. Examples of lithium garnet SSE materials include, but are not limited to, $Li_3$-phase lithium garnet SSE materials (e.g., $Li_3CTe_2O_{12}$, where C is a lanthanide such as Y, Pr, Nd, Sm, Eu, Gd, Tb, Dy, Ho, Er, Tm, Yb, Lu, Zr, Ta, or a combination thereof and $Li_{3+x}Nd_3Te_{2-x}O_{12}$, where x is 0.05 to 1.5, $Li_5$-phase lithium garnet SSE materials (e.g., $Li_5La_3M^1{}_2O_{12}$, where $M^1$ is Nb, Zr, Ta, Sb, or a combination thereof, cation-substituted $Li_5La_3M^1{}_2O_{12}$ such as, for example, $Li_6ALa_3M^1{}_2O_{12}$, where A is Mg, Ca, Sr, Ba, or combinations thereof, and $Li_7La_3B_2O_{12}$, where B is Zr, Sn, or a combination thereof); $Li_6$-phase lithium garnet SSE materials (e.g., $Li_6DLa_2M^3{}_2O_{12}$, where D is Mg, Ca, Sr, Ba, or a combination thereof and $M^3$ is Nb, Ta, or a combination thereof); cation-doped $Li_6La_2BaTa_2O_{12}$; cation-doped $Li_6BaY_2M^1{}_2O_{12}$, where cation dopants are barium, yttrium, zinc, or combinations thereof, an Liz-phase lithium garnet SSE material (e.g., cubic $Li_7La_3Zr_2O_{12}$ and $Li_7Y_3Zr_2O_{12}$,); cation-doped $Li_7La_3Zr_2O_{12}$; $Li_{5+2x}La_3$, $Ta_{2-x}O_{12}$, where x is 0.1 to 1, $Li_{6.8}(La_{2.95},Ca_{0.05})(Zr_{1.75},Nb_{0.25})O_{12}$ (LLCZN), $Li_{6.4}Y_3Zr_{1.4}Ta_{0.6}O_{12}$, $Li_{6.5}La_{2.5}Ba_{0.5}TaZrO_{12}$, $Li_6BaY_2M^1{}_2O_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$), lithium garnet composite materials (e.g., lithium garnet-conductive carbon matrix (optionally, including sulfur)). Other examples of lithium-ion conducting SSE materials include cubic garnet-type materials such as 3 mol % YSZ-doped $Li_{7.06}La_3Zr_{1.94}Y_{0.06}O_{12}$ and 8 mol % YSZ-doped $Li_{7.16}La_3Zr_{1.94}Y_{0.06}O_{12}$.

SSE material can be a sodium-ion conducting material. For example, a SSE material comprises an SSE material selected from β"-$Al_2O_3$, porous or dense $Na_4Zr_2Si_2PO_{12}$ (NASICON), cation-doped NASICON (e.g., $Na_4ZrAlSi_2PO_{12}$, $Na_4ZrFeSi_2PO_{12}$, $Na_3Zr_{1.94}Y_{0.06}Si_2PO_{12}$, $Na_4ZrSbSi_2PO_{12}$, and $Na_4ZrDySi_2PO_{12}$).

SSE material can be a magnesium-ion conducting material. For example, a SSE material comprises an SSE material selected from $Mg_{1+x}(Al,Ti)_2(PO_4)_6$, NASICON-type magnesium-ion conducting materials (e.g., $Mg_{1-2x}(Zr_{1-x}MO_4P_6O_{24})$ and $Mg_{1-2x}(Zr_{1-x}M_x)(WO_4)_3$, where x is 0.01 to 0.5).

Interfacial layers and devices can be made using methods known in the art. For example, a metal oxide layer is formed by physical deposition methods (e.g., sputtering) or chemical vapor deposition methods (e.g., atomic layer deposition (ALD)), or solution based methods (e.g., sol-gel methods). A polymer material, gel material, or ion-conducting liquid layer can be formed by polymer or liquid coating methods known in the art. A polymer material layer can be formed by vacuum-based methods.

For example, PFPE-based electrolytes can be filled into garnet membranes by vacuum assisted methods. The hybrid electrolyte is expected to have a much lower impedance than the garnet tape itself due to the improvement of ion transport through the grains. The PFPE-LiTFSI electrolytes can be filled in after the assembly of the symmetrical cells with a configuration of Li/garnet/Li. Impedance can be measured by varying the temperature to obtain the activation energy and ionic conductivity. EIS can be used to investigate interfacial impedance before and after PFPE-based organic electrolytes as interlayers. Garnets with different surface morphology and surface area can be fabricated.

In another example, a gel electrolyte is infiltrated into garnet pores to create a solid-state/gel hybrid electrolyte, which can help overcome the high interfacial resistance between electrodes and solid state electrolyte, as well as boost the conductivity of the electrolyte phase altogether. This hybrid electrolyte may also serve to prevent dendrite growth and penetration, allowing the high conductivity of conventional electrolytes in a lithium metal secondary battery. For example, PVDF-HFP gel electrolyte was uniaxially pressed at 125 MPa into a porous $Li_{7.06}La_3Zr_{1.94}Y_{0.06}O_{12}$ garnet pellet as seen in FIG. 3. As demonstrated in the electron micrographs in FIG. 3, the garnet shows highly interconnected porosity that is filled with the gel electrolyte after pressing. It should be noted that when the gel electrolyte is put under high vacuum in the SEM, the higher vapor pressure compounds will volatilize and the electrolyte shrinks, leaving empty areas that may not have exists during testing.

ALD-oxide can improve Li-garnet wetting. For example, for the anode side, Li-metal can be coated on the garnet surface. To increase the interface contact between Li-metal and garnet, we can apply ALD oxides resulting in desirable wetting (FIG. 4 (a) and (b)). It was found that the depth of Li metal filtration can depend on the temperature and duration.

PFPE based electrolytes can be prepared using known methods. For example, commercially available hydroxyl-terminated PFPEs with nominal molecular weight of, for example, 1000 to 4000 g/mol can be modified to form methylcarbonate-terminated PFPEs (PFPE-DMC), which are expected to have desirable thermal stability and fire resistance. PFPE-DMCs are expected to have desirable solubility of lithium salts such as lithium bis(trifluoromethanesulfonyl)imide (LiTFSI). PFPE-DMC with dissolved LiTFSI as electrolytes are expected to have a high transfer number, t~0.9, which is similar to garnet electrolytes.

Devices such as solid-state batteries can be formed using methods known in the art. For example, layer-by-layer methods known in current LiB fabrication methods can be used to fabricate Li-garnet-NMC cells.

For example, CNTs can be used as both the binder and conductive additive. First, Al foil is deposited with NMC/CNT composite. Then garnet tape can be fabricated on it at intermediate temperature (<500° C.). PFPE or gel electrolytes can be filled in the devices under vacuum.

In another example, Li-metal on the anode side can be filled in the porous structure of garnet electrolytes after ALD oxide coating. Interfacial impedance can be significantly decreased by filling gel electrolytes in garnet pores. The cell can be finished with metal current collectors. At the lab scale, Al foil can be used for the cathode and Cu foil for the anode. Bipolar metals can be used for cell stacking and integration. To improve the electrical contact between electrodes and current collectors, a thin graphene layer may be applied. For example, low-cost graphene ink can be used.

In yet another example, for an ALD-garnet, a dense Li-rich garnet membrane is coated with an ALD oxide. A heating process can be used to lithiate oxide layer in order to achieve an effective nanoscale glue to increase the ionic conductivity. The ALD oxides can also fill the pores to form a dense layer.

Figure 2:
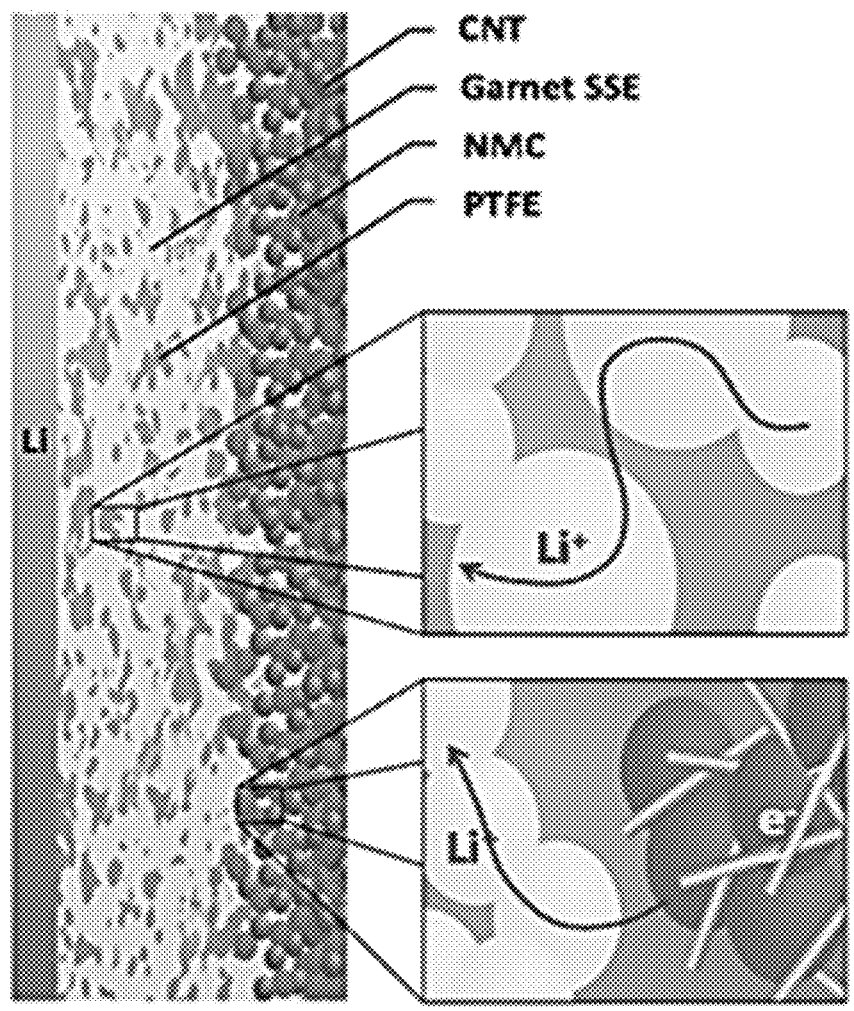
FIG. 2. Schematic of an example of a high voltage Li-NMC cell with an interfacial layer.
Figure 6:
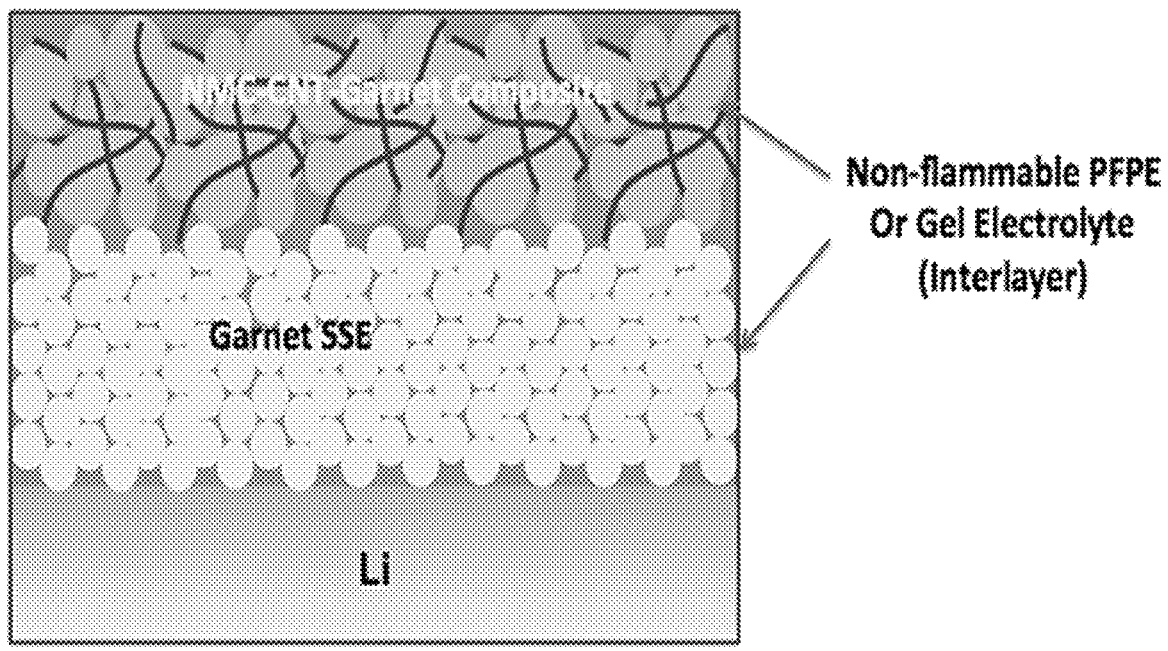
FIG. 6. Schematic of an example of SSLiBs with NMC-CNT-garnet composite cathode, Li anode and garnet SSE. Nonflammable PFPE and gel-electrolytes can be used as interlayer to decrease interface impedance.
Figure 7:
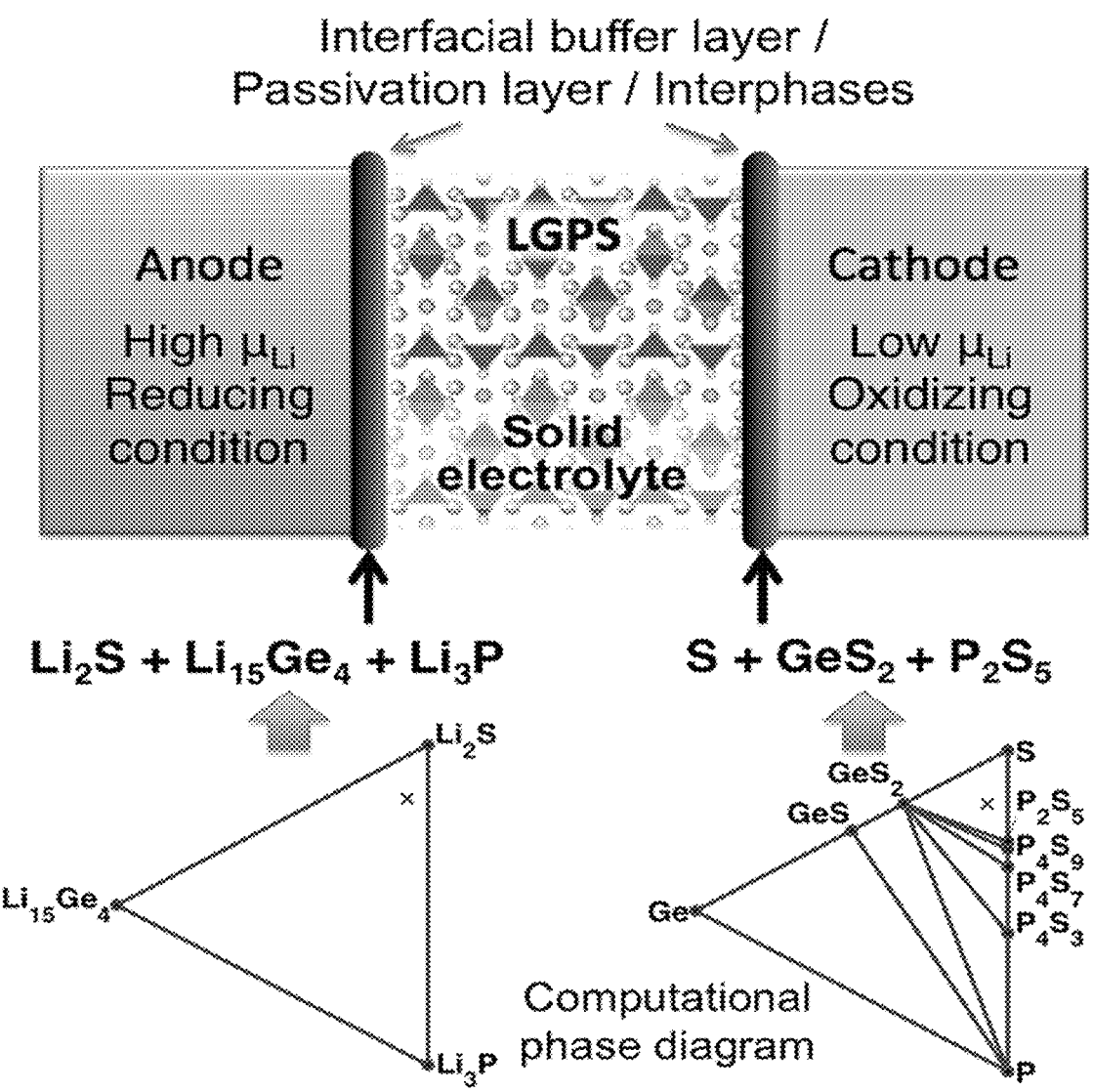
FIG. 7. Computational techniques to identify the interfacial decomposition products, atomistic structures and the charge transport impedance at the electrolyte-electrode interfaces.

An example of a device structure is outlined in FIG. 6, where Li metal is the anode, NMC mixed with percolative CNT and garnet is the cathode, and garnet membrane is used as the electrolyte membrane. After packing the layers together, the interlayer materials can be filled with, for example, PFPE or gel based electrolytes to improve the interfaces. FIG. 2 shows an example of fabrication of full cells layer-by-layer. PFPE electrolytes can be vacuum filled in the end. The viscosity can be tuned with different concentration for filling purpose. Transport path for ions and electrodes can be provided by percolative conductive carbon (such as CNT or graphene) and garnet SSEs. Li metal can be applied as anode with the assist of ALD oxide coating.

A hybrid electrolyte can comprise a mixture of a soft organic or soft inorganic material and a SSE material (a composite material). For example, a composite material comprises 10 to 90 weight percent, including all integer percent values and ranges therebetween, of one or more soft organic material or soft inorganic material (based on the total soft organic or inorganic material and SSE material present). The hybrid electrolyte can reduce SSE interfacial impedance.

For example, dry milling methods can be used to mix LPS with garnet particles to form a conformal coating of LPS on the surface of garnet that can improve the interface for charge transport and structure integrity during the charging-discharge processes.

For example, a composite electrolyte can consist mainly of garnet with about 5-10% LPS to improve the interface properties of the composite electrolytes. In a typical experiment, the precursors of both LPS and garnet electrolytes are mixed using previously known methods. Then the composite is, for example, calcined in an inert atmosphere at 1000° C. for 8 hours with a heating rate of 250° C./hour.

In an aspect, the present disclosure provides devices comprising one or more interfacial layers and/or one or more hybrid electrolyte materials of the present disclosure. For example, the device is an electrochemical device such as a battery. Examples of batteries include solid-state batteries or flow batteries. Examples of suitable battery architectures are known in the art.

A device can be a solid-state battery. For example, a solid-state ion-conducting battery comprises one or more interfacial layers of the present disclosure and/or one or more hybrid electrolyte materials of the present disclosure and may further comprise an SSE material, cathode material, and an anode material.

Suitable electrode materials (cathode materials and anode materials) are known in the art. Suitable electrode materials are commercially available and can be made by methods known in the art.

A solid-state battery may also further comprise a cathode-side current collector (e.g., a conducting metal or metal alloy) and/or an anode-side current collector (e.g., a conducting metal or metal alloy). Suitable metals and metal alloys for current collectors are known in the art.

Interfacial layer(s), SSE material(s), ion-conducting cathode material, the ion-conducting anode material, and one or more of the current collectors can form a cell. A solid-state, ion-conducting battery can comprise a plurality of the cells and each adjacent pair of the cells is separated by a bipolar plate.

A solid-state ion conducting battery can be a lithium-ion conducting solid-state battery and the interfacial layer(s) is/are interfacial layers in contact with a lithium-ion SSE material. Cathode material can be selected from a lithium-containing cathode materials (e.g., Li(NiMnCo)$_{1/3}$O$_2$ (NMC), LiCoO$_2$, LiFePO$_4$, Li$_2$MMn$_3$O$_8$, wherein M is selected from Fe, Co, and combinations thereof), conducting carbon materials (e.g., carbon nanotubes, graphene) that, optionally, further comprise an organic or gel ion-conducting electrolyte, and polysulfide materials and/or anode material can be selected from lithium metal, silicon, conducting carbon materials (e.g., graphite, carbon black, carbon nanotubes, and graphene) that, optionally, further comprise an organic or gel ion-conducting electrolyte, and oxygen (e.g., air).

A solid-state ion conducting battery can be a sodium-ion conducting solid-state battery and the interfacial layer(s) is/are interfacial layers in contact with a sodium-ion SSE material. Cathode material can be selected from sodium-containing cathode materials (e.g., Na$_2$V$_2$O$_5$, P$_2$—Na$_{2/3}$Fe$_{1/2}$Mn$_{1/2}$O$_2$, Na$_3$V$_2$(PO$_4$)$_3$, NaMn$_{1/3}$Co$_{1/3}$Ni$_{1/3}$PO$_4$, and Na$_{2/3}$Fe$_{1/2}$Mn$_{1/2}$O$_2$@graphene composite), sulfur, sulfur composite materials, and polysulfide materials and/or anode material can be selected from sodium metal, tin, phosphorus, and an ion-conducting, sodium-containing anode materials (e.g., Na$_2$C$_8$H$_4$O$_4$ and Na$_{0.06}$Li$_{0.22}$Ti$_{0.78}$O$_2$) and oxygen (e.g., air).

A solid-state ion conducting battery can be a magnesium-ion conducting solid-state battery and the interfacial layer(s) is/are interfacial layers in contact with a magnesium-ion SSE material. For example, cathode material can be a magnesium-containing cathode material (e.g., a doped magnesium oxide) and/or anode material can be magnesium metal.

The interfacial resistance of a device comprising one or more interfacial layer can be 10 times or less, 20 times or less, 30 times or less, 40 times or less, 50 times or less, 100 times or less, 200 times or less, or 300 times or less than the resistance of the same device that does not have the one or more interfacial layer. The interfacial resistance of a device comprising one or more interfacial layer can be 750 Ω·cm$^2$ or less, 500 Ω·cm$^2$ or less, 400 Ω·cm$^2$ or less, 300 Ω·cm$^2$ or less, 200 Ω·cm$^2$ or less, 100 Ω·cm$^2$ or less, 50 Ω·cm$^2$ or less, 40 Ω·cm$^2$ or less, 30 Ω·cm$^2$ or less, 20 Ω·cm$^2$ or less, 10 Ω·cm$^2$ or less, 50 Ω·cm$^2$ or less, 4 Ω·cm$^2$ or less, 3 Ω·cm$^2$ or less, or 2 Ω·cm$^2$ or less.

The following examples are presented to illustrate the present disclosure. They are not intended to limiting in any manner.

Example 1

The following example provides an example of the fabrication of interfacial layers of the present disclosure.

The large interfacial impedance between lithium metal anode and the garnet electrolyte was addressed using ultra-thin aluminum oxide (Al$_2$O$_3$) by atomic layer deposition (ALD). Li$_7$La$_{2.75}$Ca$_{0.25}$Zr$_{1.75}$Nb$_{0.25}$O$_{12}$ (LLCZN) is used as the garnet material due to increased lithium ion conductivity. A 300-fold decrease of DC interfacial impedance, from 606 Ω·cm$^2$ to 2 Ω·cm$^2$, was observed at room temperature, effectively negating the lithium-metal/garnet interfacial impedance. Experimental and computational results reveal that the oxide coating enables wetting of metallic lithium in contact with the garnet electrolyte surface and the lithiated-alumina interface allows effective lithium ion transport between the lithium metal anode and garnet electrolyte. A working cell with lithium metal anode, garnet electrolyte and a high voltage cathode was demonstrated by applying the interface chemistry described herein.

It was demonstrated that introduction of an ultrathin Al$_2$O$_3$ coating on garnet-like Li$_7$La$_{2.75}$Ca$_{0.25}$Zr$_{1.75}$Nb$_{0.25}$O$_{12}$ (LLCZN) via atomic layer deposition (ALD) dramatically improves the wetting between Li metal and garnet SSE and leads to a 300 fold decrease in DC interfacial to only 2 Ω·cm$^2$. Experimental and computation studies were employed to investigate the possible mechanism for the ALD-$Al_2O_3$ coating on the garnet/Li interface improvement.

Characterization of garnet LLCZN solid electrolyte. Garnet-structured oxide $Li_7La_{2.75}Ca_{0.25}Zr_{1.75}Nb_{0.25}O_{12}$ (LLCZN) was synthesized, sintered and polished into thin solid electrolyte pellets. The common garnet composition is $Li_7La_3Zr_2O_{12}$ (LLZO), and the simultaneous substitution of $La^{3+}$ site with $Ca^{2+}$ and $Zr^{4+}$ site with $Nb^{5+}$ brings merits of stabilized cubic garnet-phase with increased Li-ion conductivity.

Conformal interface between Li metal and ALD-$Al_2O_3$ coated LLCZN. Based on the observed stability between Li metal and LLCZN garnet, a two-step process was designed to achieve a conformal interface on thin pellet LLCZN. First a ~1 nm thick ALD-$Al_2O_3$ coating was applied to the garnet surface. Then a piece of Li metal foil was pressed on the garnet pellets using a hydraulic presser at 50 psi, and then the stacked garnet/Li pellet was heated at 250° C. for 1 hour under a small pressure A control sample was made using bare LLCZN pellets in the same way. For ALD-$Al_2O_3$ coated garnet, an intimate, conformal interface was observed by SEM (FIG. 8(c)). In contrast, the control sample showed apparent gaps (FIG. 8(d)), which is problematic because it can lead to high interfacial impedance. It was reported that Li metal cannot wet garnet LLZO until heating for a long time (24-168 hours) at temperature 300-350° C., much higher than Li metal melting point 180.5° C. Our two-step process to integrate Li metal with garnet at a relative low temperature causes neither color centers nor cracks. The observed conformal interface of garnet/Li is a direct result from the ALD oxide coating.

Interface impedance of LLCZN/Li metal. To investigate the interfacial impedance between Li metal and garnet LLCZN, symmetrical cell as shown in FIG. 9(a) were fabricated with and without an ALD-$Al_2O_3$ coating. Cells were assembled with otherwise identical procedures and used garnet from the same batch of sintered pellets in order to maximize consistency and isolate the effect of ALD. The LLZCN pellets used were 200 μm thick with electrode surface areas of 0.49 $cm^2$. The ALD coated samples had a ~1 nm layer of $Al_2O_3$ on all exposed surfaces. Samples were measured with EIS at 22° C. to identify individual contributions to the impedance. The resulting measurements are given in FIG. 9(b). Two distinct arcs were seen in each sample, which were fit by an equivalent circuit. The bulk area specific resistances (ASRs), determined from equivalent circuit fitting to find the high frequency x-intercepts, are 26 and 28 $Ω·cm^2$ for cells with and without ALD coating, respectively. The first arc represents the grain boundary impedance, with capacitances of $3.1×10^{-9}$ F and $2.1×10^{-9}$ F for cells with and without ALD, respectively. The grain boundary ASRs were found to be 150 $Ω·cm^2$ and 4500 $Ω·cm^2$ for cells with and without ALD coating, respectively. Since the garnet pellets used in the two cases share identical origin, the dramatically higher ASR in the non-ALD sample is due to poor interfacial contact (shown previously in FIG. 8(d)) and an overlap in the grain boundary and Li-metal/garnet interfacial impedance frequency dispersion. The second arc is characteristic of the interfacial impedance, with capacitances of $9.9×10^{-4}$ and $2.8×10^{-5}$ F, for the cells with and without ALD coating, respectively. Interfacial ASR was calculated by dividing the resistance by two before normalizing to the electrode surface area, since there are two electrodes per cell. It can be seen that the ALD treatment decreased the interfacial ASR by EIS from 490 $Ω·cm^2$ to 16 $Ω·cm^2$. The reduction can be possibly attributed to the following reasons: (1) conformal coating with intimate Li metal and SSE contact increases the effective ionic transfer area; (2) the spontaneously lithiated $Al_2O_3$ formed by contact with Li metal at 250° C. is Li-ion conductive and effectively transports ions between garnet and Li metal; and (3) the ALD layer prevents $Li_2CO_3$ formation on the garnet surface.

We further carried out DC Li plating and stripping experiments to evaluate the interfacial impedance and Li-ion transport capability across the garnet and Li metal interface. The samples used in this measurement were the same as discussed above. At a current density of 71 μA/$cm^2$, the Li/LLCZN/Li cell with an ALD coating stabilized quickly at ~2 mV. On the other hand, the control cell without ALD coating displayed a noisy polarized potential around 45 mV. The Li/LLCZN/Li cell with an ALD coating cycled hundreds of times without any perceivable degradation. FIG. 9(d) shows 80 hours of cycling at a current density of 160 μA/$cm^2$ to either direction for 20 minutes and a stable voltage response at ~4.5 mV. The current density was further increased to 300 μA/$cm^2$ resulting in a polarization voltage of 8.5 mV (FIG. 9(e)). The observed cycling with small polarization confirms that low interfacial impedance and a stable interface during Li cycling were obtained with the ALD oxide interfacial layer. The stable interface is possibly due to the high ductility of the lithiated $Al_2O_3$, which agrees with literature on the mechanical properties of lithiated and sodiated $Al_2O_3$. The ASR calculated from the DC stripping/plating test is ~28 $Ω·cm^2$, close to the bulk ASR measured by EIS before the cycling test, which indicates the effective removal of both the Li/garnet interfacial impedance and the grain boundary impedance. To confirm this result, cell impedance by EIS was measured again after cycling.

In FIG. 9(f), the EIS of the Li/LLCZN/Li cell after cycling is plotted along with the EIS before cycling and a notation of the calculated ASR from DC cycling. As shown in this figure, the only remaining contributor to the impedance seems to be the bulk conductivity of the electrolyte, with matching between the DC ASR, and the bulk ASR from EIS before and after cycling. The lack of low frequency arcs confirms the effective negating of both the Li/garnet interfacial impedance and the grain boundary resistance. These effects are likely due to Li plating during cycling improving the Li-metal/garnet interface, and potentially an increase in the lithium content in the grain boundaries decreasing space charge contributions to the grain boundary impedance.

The electrical parameters for the two symmetric cells are summarized in Table 1 based on the above EIS and DC cycling data. Note that after cycling no grain boundary impedance was observed so there are no impedance contributions to include in Table 1. These results clearly suggest that the ultrathin ALD-$Al_2O_3$ coating facilitates Li-ion transport through the solid LLCZN/Li interface.

TABLE 1

DC ASR and Fitting data for Li/LLCZN/Li cells with and without ALD coating on both sides of garnet SSEs before DC cycling.

| LLCZN SSE | Bulk ($\Omega \cdot cm^2$) ASR | Grain boundary ASR ($\Omega \cdot cm^2$) | Grain boundary capacitance (F) | Interfacial ASR ($\Omega \cdot cm^2$) | Interfacial capacitance (F) | DC ASR ($\Omega \cdot cm^2$) | DC ASR minus bulk ASR ($\Omega \cdot cm^2$) |
|---|---|---|---|---|---|---|---|
| No ALD | 28 | 4500 | $2.09 \times 10^{-9}$ | 490 | $9.9 \times 10^{-4}$ | 634 | 606 |
| ALD | 26 | 150 | $3.09 \times 10^{-9}$ | 16 | $2.8 \times 10^{-5}$ | 28 | 2 |

First principles computation of Li metal and garnet interface. First principle computation was employed to investigate the mechanisms of the interface improvements between Li metal and garnet after ultrathin ALD-$Al_2O_3$ coating. Firstly, the binding energy of Li metal on lithiated-alumina thin film with a variety of Li stoichiometry $Li_xAl_2O_{3+x/2}$ (x=0.4 to 1.4) was calculated. The results prove a strong chemical binding between Li metal on $Li_xAl_2O_{3+x/2}$ (x=0.4 to 1.4) with high binding energies ranging from 6.0 to 11.4 eV/$nm^2$. In turn, this strong interface binding improves the wetting of the Li metal on the $Al_2O_3$ coated solid electrolyte. The ultrathin alumina after lithiation is also a good Li-ion conductor and provides effective Li-ion transport paths and low interfacial resistance between Li metal and the garnet. Since garnet electrolyte is difficult to fabricate without any exposure to air, $Li_2CO_3$ seems to exist on garnet surface. Given this, a thin layer of $Li_2CO_3$ is assumed to cover garnet. The interface binding energy between Li metal and the $Li_2CO_3$ layer is calculated as 1.6 eV/$nm_2$, which is significantly lower than that between Li and the lithiated alumina (FIG. 11(a),(b)). The weak binding energy leads to low contact area, thus forming gaps and intervals. The existence of gaps, intervals and $Li_2CO_3$ in the garnet/Li interface would cause large interfacial resistance. This computation result agrees with notable decrease of interfacial impedance after ultrathin ALD-$Al_2O_3$ coating.

Secondly, chemical interfacial stability was also calculated for garnet/Li metal from first principles. Based on the Li grand potential phase diagram of the LLZO system (FIG. 11(c)), a small decomposition energy of −27 kJ/mole is calculated for the bare cubic LLZO in contact with Li. This decomposition corresponds to a composition of $Li_2O$, Zr, and $La_2O_3$, indicating a potential tendency for the Li reduction of garnet. Compared to the undoped LLZO, the doped garnet LLCZN used in this study has similar phase stability against Li metal and phase equilibria with additional decomposed compositions, CaO and Nb. The relatively small thermodynamic driving force for the Li reduction of garnet may explain its relative stability against Li metal. At high temperatures (>300° C.), the decomposition of garnet contacting Li metal may proceed and lead to a significant volume expansion up to ~50% on the basis of the first principles calculations. This is supported by the experimental evidence of low-angle shifting XRD peaks of LLCZN subjected heating with Li metal. This large volume expansion localized at the interface may crack the garnet electrolyte and induce a mechanical failure as shown in a previous experimental study. In addition, the decomposition of the garnet electrolyte forms an interphase layer similar to solid electrolyte interphase (SEI) but with poor Li-ion conductivity. The decomposed materials may contain $Li_2O/Li_2O_2$, $La_2O_3$, Zr/ZrxO, CaO, Nb/$NbO_x$, and also possible air contaminations such as $La_2ZrO_7$, $Li_2CO_3$, detrimental for good interfacial ionic conduction. In contrast, the Li grand canonical phase diagram (FIG. 11(d),(e)) indicates that garnet LLZO, similar for LLZCN, is stabilized with lithiated alumina in an equilibrium Li chemical potential (μLi) window of −0.06 eV to −1.23 eV. Therefore, the introduction of ALD-$Al_2O_3$ coating protects garnet from its decomposition via reacting with metallic Li, and maintains stable, high-conductive interface for garnet electrolyte with Li metal anode. The experimental results on Galvanostatic cycling for long time without an increase of voltage agree with the computation on the stable interface between Li metal and ALD-coated garnet.

An innovative strategy was developed to solve interfacial issues between Li metal anode and garnet-type LLCZN solid electrolyte toward all SSLiBs. Ultrathin ALD coating of $Al_2O_3$ effectively decreased the DC interfacial ASR from 606 $\Omega \cdot cm^2$ to 2 $\Omega \cdot cm^2$ by DC cycling, with a further dramatic reduction in grain boundary impedance by cycling. A working full cell was demonstrated using high-voltage cathode LFMO, garnet LLCZN, and Li metal anode. The possible mechanism for the interface improvement is proposed based on experimental and computational evidence: (1) the ALD-$Al_2O_3$ coating on garnet enables conformal interface of garnet/Li; (2) the higher binding energy of Li with lithiated alumina further enhances the conformal interface; (3) ultrathin lithiated alumina provides high Li-ion transport paths through the interface; and (4) the $Al_2O_3$ coating could possibly prevent both $Li_2CO_3$ formation and garnet decomposition in contact with Li metal, and maintains garnet/Li interface stability and observed electrical properties. This nanoscale interface engineering provides a general strategy to solve the interface issue between Li metal and SSEs toward high energy density, safe, all-SSLiBs.

Methods. Materials synthesis. The LLCZN Garnet electrolyte was synthesized via a sol-gel method. The starting materials were $La(NO_3)_3$ (99.9%, Alfa Aesar), $ZrO(NO_3)_2$ (99.9%, Alfa Asear), $LiNO_3$ (99%, Alfa Aesar), $NbCl_5$ (99.99%, Alfa Aesar) and $Ca(NO_3)_2$ (99.9%, Sigma Aldrich). Stoichiometric amounts of chemicals were dissolved in de-ionized water and 10% excess $LiNO_3$ was added to compensate for lithium volatilization during high temperature synthesis. Citric acid and ethylene glycol in the mole ratio of 1:1 were consequently added into the solution. The solution was slowly evaporated on hotplate to produce the precursor gel with stirring, which was then heated to 400° C. for 10 hours to burn out the organics. After this, the obtained powder was ball milled and pressed into pellets for calcination at 800° C. for 10 hours. And then, the synthesized powders were then uniaxially pressed into pellets, which were sintered at 1050° C. for 12 hours in an alumina boat covered with the same powder. The resulting LLCZN pellets with diameters of 2.54, 1.27, 0.79 cm were uniformly polished to thickness of about 150-200 μm with smooth surface using fine sand paper #200, #500, and #1200 (LECO).

Characterization. SEM (Scanning Electron Microscopy) was performed with a Hitachi SU-70 analytical scanning electron microscope. The phase analysis was performed with powder X-ray diffraction (XRD) on D8 Advanced with LynxEye and SolX (Bruker AXS, WI, USA) using a Cu Kα radiation source operated at 40 kV and 40 mA.

Atomic layer deposition for LLCZN electrolyte pellets. The atomic layer deposition was performed with Beneq TFS 500 for $Al_2O_3$ deposition. High-purity nitrogen at 150° C. was used as carrier gas for the whole process. Typically, for 1 nm $Al_2O_3$ coating, 10 ALD cycles were performed. Each cycle included alternating flows of trimethylaluminum (TMA, 4 sec, Al precursor) and water (4 sec, oxidant) separated by flows of pure nitrogen gas (4 and 10 sec, respectively, carrier and cleaning gas). The ultrathin layer of $Al_2O_3$ was estimated according to a control on Si wafer with atomic force microscopy (AFM).

Assembly of Li metal coated LLCZN. A thin Li foil disk (0.8 cm in diameter and 0.2 mm thick) was put on ALD-$Al_2O_3$ treated LLCZN pellets in a glovebox filled with ultrahigh pure Ar, then the stacked Li/LLCZN pellet was heated at 250° C. for 60 min with pressure of 0.26 psi applied by 6 pieces of stainless steel disks (1.5 g each). The small pressure was supposed to help the initial contact of melted lithium on the garnet surface. For control, freshly polished LLCZN pellets were assembled with lithium metal via the same procedure. After cooling down to room temperature, the thin lithium disk was stuck on the pellets. Scanning electron microscopy (SEM) was performed for the samples' cross-section obtained by breaking with tweezers.

First principles calculations. First principles calculations were performed using the Vienna Ab initio Simulation Package (VASP) within the projector augmented-wave approach with the Perdew-Burke-Ernzerhof generalized-gradient approximation (GGA) to density functional theory (DFT). The materials entries for the grand potential phase diagram were obtained from the Materials Project database. The interface models comprising a slab of amorphous Li metal and a slab of the $Li_2CO_3$ or the lithiated alumina were equilibrated using ab initio molecular dynamics simulations at 513K for 30 ps. The binding energy was calculated as the energy of the interfaces minus the energy of the separated surface slabs.

Example 2

The following example provides an example of the fabrication of interfacial layers of the present disclosure.

This example focuses on garnet-based SSEs, but it is expected that the knowledge be applicable to other SSE chemistries. In order to get low interfacial impedance solid state batteries, it may be desirable to address the following technical barriers:
Large interfacial impedance for charge transfer and transport; and
Mechanical degradation of interface with electrochemical charge/discharge cycles.

The interface EIS of garnet and LFMO electrode was characterized. It was found that structures on the surface of garnet pellet reduce the interface impedance. A PFPE nonflammable solvent was prepared, and PFPE/LiTFSI electrolyte was tested and found to be electrochemically stable in the voltage region of 0-4.2 volts (v). PVDF-HFP gel membrane was prepared, and the stability and impedance of ionic liquid electrolyte in gel membrane tested.

Characterization of Electrolyte/Cathode interface. The impedance of LLCZN solid state electrolyte and its interface impedance with LFMO electrodes was tested. The method and results are shown as following.

The LLCZN ($Li_{6.8}$ $(La_{2.95},Ca_{0.05})(Zr_{1.75},Nb_{0.25})O_{12}$) garnet was synthesized as follows: LLZO—CaNb was prepared by conventional solid state reactions. The starting materials, Li(OH), $La(OH)_3$, $Ca(OH)_2$, $ZrO_2$, and $Nb_2O_5$ were mixed by planetary ball-milling, and then calcined at 700° C. for 48 hours (h). $Li_3BO_3$ powder as an additive was prepared by heating a mixture of $Li_2CO_3$ and $B_2O_3$ at 600° C. The calcined LLZO—CaNb powder was mixed with the additives (both $Al_2O_3$ and $Li_3BO_3$, only $Al_2O_3$ or only $Li_3BO_3$) by planetary ball-milling. The mixture was die-pressed at 10 MPa into a pellet and sintered at 790° C. for 40 h in air.

Synthesis of $Li_2FeMn_3O_8$ (LFMO). LFMO was synthesized according to the literature with modification. Briefly, glycine-nitrate mixture solution was firstly prepared by dissolving lithium nitrate, iron nitrate, manganese nitrate (2:1:3, mole ratio) and glycine in de-ionized water. The mole ratio of nitrate to glycine is 2:1. Then, the LFMO powder was obtained by combustion reaction of the glycine-nitrate solution at 300° C., followed with a 2-hour annealing at 700° C.

Battery assembly and electrochemical tests. Owing to the sensitivity of Li metal to oxygen and moisture, all the cells including symmetric cells and full cells were assembled and tested in ultrahigh pure argon (99.999%) filled glovebox with moisture and oxygen levels below 0.1 and 0.01 ppm, respectively. In a typical LLCZN/Li assembly, Li foil was pressed to about 0.2 mm, and then punched into thin disks with a diameter 0.79 cm. The thin Li foil disk was spread and gently pressed on ALD-$Al_2O_3$ coated LLCZN pellets at one or both sides with a pair of plastic tweezes. Six pieces of stainless steel (9 g in total) was put on the Li foil. Then the stacked Li/ALD-$Al_2O_3$ coated LLCZN/Li cell was put in an oven in the glovebox, which was then heated at 250° C. for 1 hour, followed by natural cooling down to room temperature. The LLCZN/Li was then ready to use. The stainless steel was used as the current collector. The cathode disks were made outside the glovebox. The as-synthesized LFMO was thoroughly mixed with carbon black and PVDF at mass ratio of 80:10:10 in NMP (solvent, N-Methyl-2-pyrrolidone). The mixture was then coated on a clean and flat Al foil. After drying in air, the Al foil with cathode slurry coated was put in vacuum oven and further dried overnight at 110° C. It was then punched into cathode disks (diameter of 0.79 cm). The mass measurement was done with a microbalance (Sartorius). The full cells were assembled by putting the cathode disk on the bare side of Li/ALD-$Al_2O_3$-LLCZN pellet with a small amount of high-voltage organic liquid electrolyte added between cathode and LLCZN pellet as the liquid interfacial layer. The assembled cell was fixed using an alligator clip linked with electric cables. The cells were kept in the glovebox during all the tests. The tests were carried with a BioLogic battery tester at room temperature (23–25° C.) via a feedthrough from the glovebox. The cut voltages were 3.5 V and 5.3 V with a current density of 0.1 C (1C=150 mA/g).

Synthesis and characterization of gel and PFPE based materials. Nonflammable PFPE based electrolyte. PFPE-DMC has been prepared by the following steps. Firstly, fluorolink D10 and triethylamine in 1,1,1,3,3-pentafluorobutane were dissolved at 0° C. under stirring conditions and nitrogen atmosphere, followed by dropping a solution of methyl chloroformate in 1,1,1,3,3-pentafluorobutane. After the mixture was stirred at 25° C. for 12 h, the PFPE-DMC product was obtained by filtering and washing with water and brine, followed by evaporating under reduced atmosphere. The PFPE-DMC electrolyte was then produced by dissolving the lithium bis(trifluoromethanesulfonyl)imide into PFPE-DMC, which can vacuum filled in the garnet membrane and serves as the interlayer between garnet electrolytes and cathode materials.

A Li/PFPE/Ti structure built up in a CR2025 coin cell was used to tested cyclic voltammetry (CV) of the PFPE/LiTFSI electrolyte. The area of the cell is 1.98 cm$^2$ (radius=$5/16$ inch), and the area of titanium cathode is 0.712 cm$^2$ (radius=$5/32$ inch). The voltage range is −0.3~4.2 V, and the voltage scan speed is 1 mV/s.

The reaction current density is less than 0.002 mA in 0.3~4.2V region, which is very small. And after the first few cycles, the CV curve becomes stable. The two facts show that the PFPE electrolyte is electrochemical stable between 0-4V. Also, for the PFPE electrolyte, no obvious peaks appear in the voltage region of −0.3~4.2 V, which means that the Li stripping occurs at a higher voltage than 4.2 V, and the Li platting occurs at a lower voltage than −0.3 V. The electrochemical stability of PFPE/LiTFSI in the voltage range of 0~4.2 V ensures that this electrolyte is stable in the reactions of LLCZN garnet electrolyte lithium ion batteries, and can be used as the interfacial layer between garnet and cathode.

Figure 12:
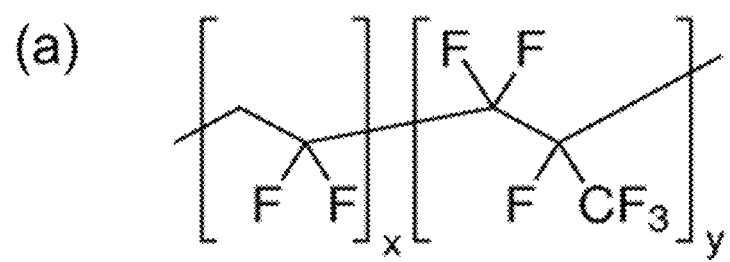
FIG. 12. (a) Formula, and top (b) and side (c) SEM images of PVDF-HFP gel membrane.
Figure 12:
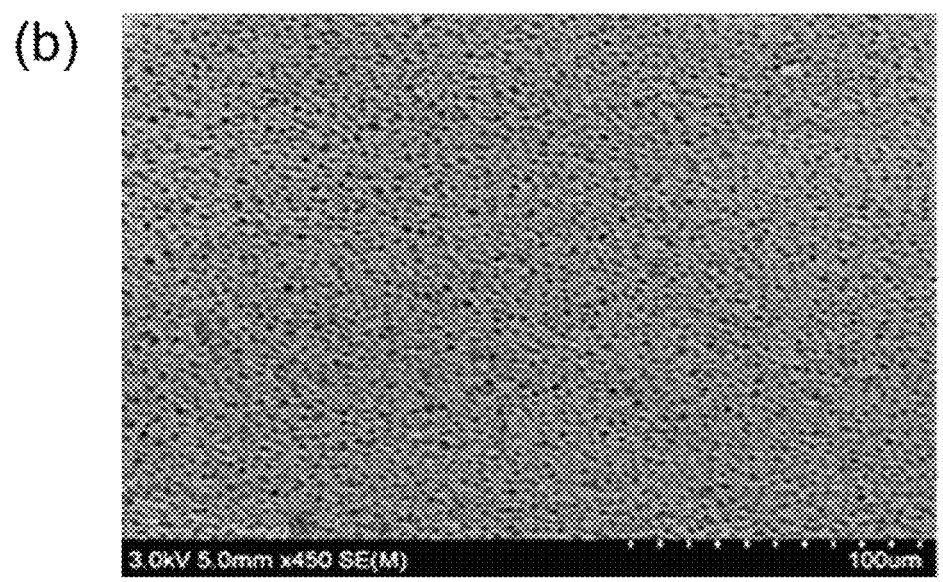
Figure 12:
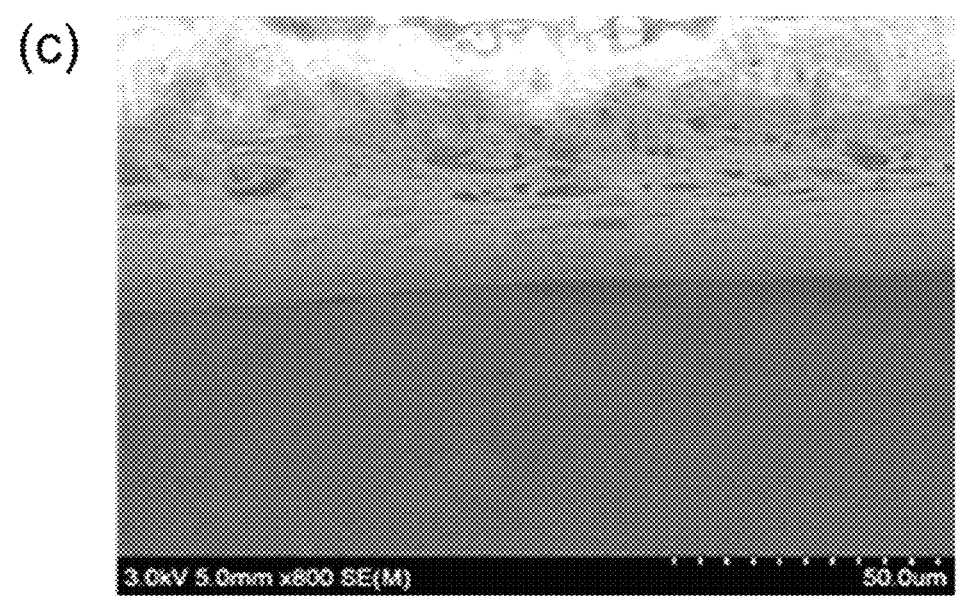

Gel based electrolyte. The PVDF-HFP based gel polymer was prepared by the following steps: 0.25 g PVDF-HFP was dissolved into a mixture of 4.75 g acetone and 0.25 g DI water (95:5, m/m) under continuous stirring for 1 h. The solution was cast onto a Al foil and the solvent was evaporated at ambient temperature. FIG. 12 shows (a) the formula, and (b) top and (c) side SEM images of the PVDF-HFP gel membrane. After drying under vacuum at 100° C. for 2 h, a homogeneous free standing membrane was obtained.

The as-prepared porous membrane was immersed into the 1 M LiTFSI in a mixture of 1:1 volume ratio of tetraethylene glycol dimethyl ether and n-methyl-(n-butyl) pyrrolidinium bis(trifluoromethanesulfonyl)imide (Py14TFSI) in the room temperature for 30 mins in an argon-filled glovebox with water and oxygen contents below 0.1 ppm.

A cyclic voltammetry (CV) testing cell was set up by sandwiching the polymer gel electrolyte membrane between lithium and titanium disks and sealing the configuration into CR2032 coin cells. The cyclic voltammetry with a scan rate of 1 mV/s suggests that the stable electrochemical window of such polymer gel electrolyte is up to 4.2 V. The sharp peak at −0.2 V corresponds to the Li plating, while the peak around 0.1 V is due to the Li stripping.

Figure 13:
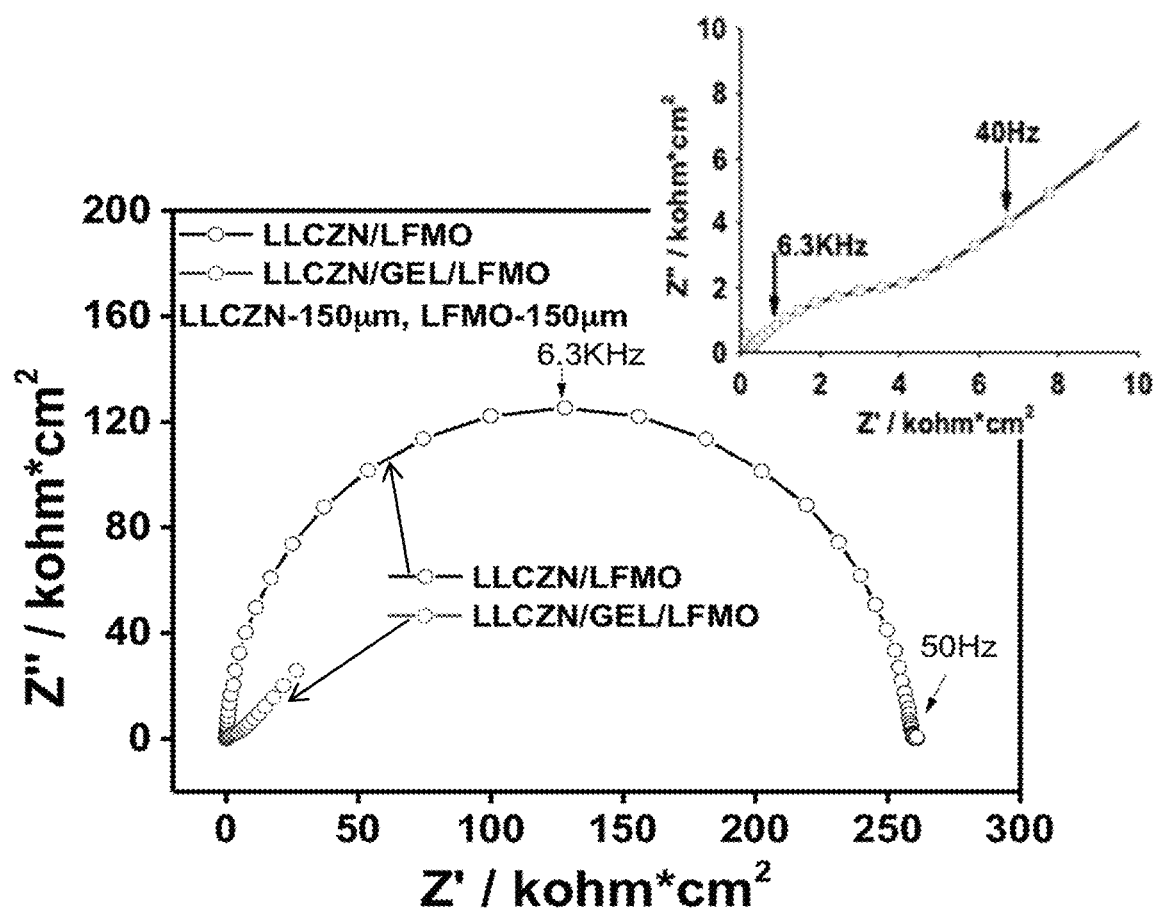
FIG. 13. EIS of a garnet/cathode and a garnet/gel/cathode cell.

FIG. 13 shows the effect of gel polymer on reduction of impedance at the LLCZN electrolyte/LFMO cathode interface. The pristine LLCZN electrolyte/LFMO cathode reveals a huge resistance of 300 k$\Omega$*cm$^2$, which consists of bulk resistance of electrolyte and cathode, as well as the significant interfacial resistance between electrolyte and cathode at medium and low frequency range. Introduction of the gel interfacial layer, which provides high Li-ion conduction path, conformal and elastic contact between electrolyte and cathode, and results in great reduction of the interfacial resistance, as shown in the medium frequency range in the magnified plot. In addition, the EIS curve shows a different shape, consisting of Warburg-type impedance at low frequency, corresponding to the capacitive behavior of gold blocking electrode.

The interfacial impedance between LLCZN garnet electrolyte and LFMO electrode has been tested, and it was found that structures on the surface of garnet pallets can reduce the interfacial impedance.

PVDF-HFP gel membrane was fabricated, and shows desired pore structures under SEM. Cycle electrochemical tests showed that the gel electrolyte is electrochemically stable between 0-4.2 v. This means that it can be used as the interfacial layer between garnet electrolyte and LFMO cathode. And the EIS of LLCZN/GEL/LFMO was tested. The total impedance decreased compared with LLCZN/LFMO system without the interfacial layer.

PFPE nonflammable electrolyte was also fabricated. The cycle electrochemical tests of Li/PFPE/Ti system shows that this electrolyte is stable between 0-4.2 v, which means that it can be used as the interfacial layer between garnet electrolyte and LFMO cathode.

Example 3

The following example provides an example of the fabrication of interfacial layers of the present disclosure.

Figure 11:
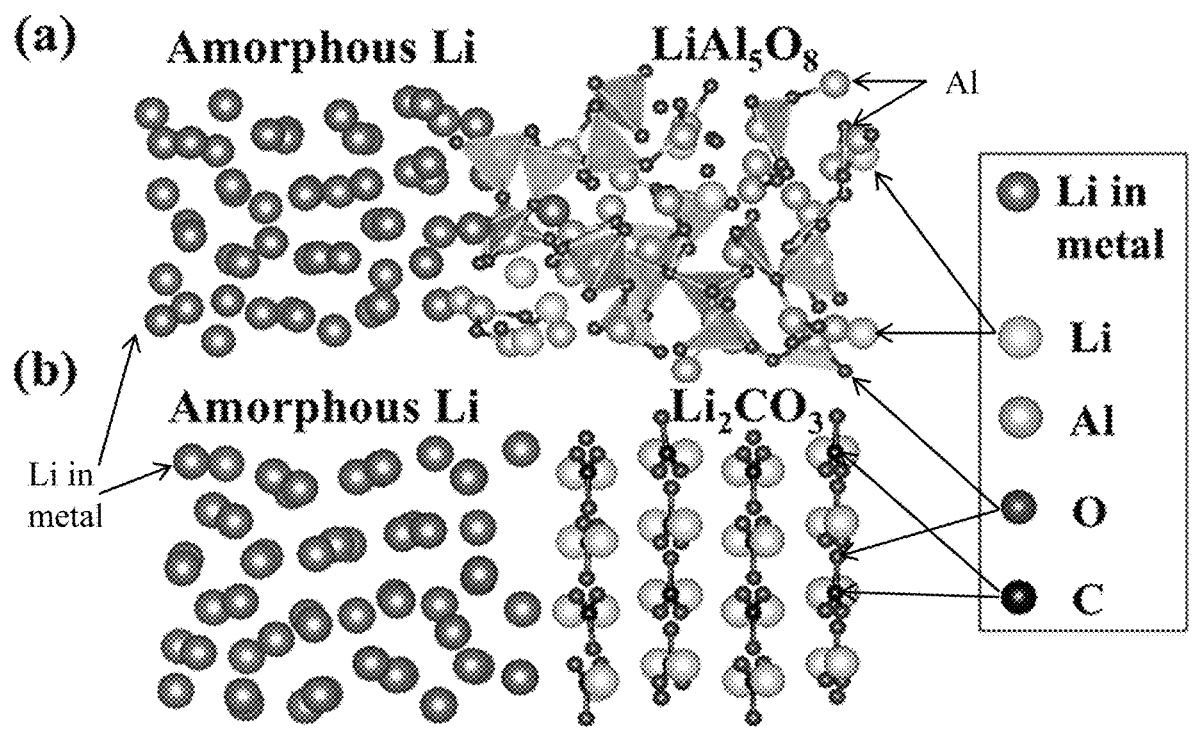
FIG. 11. First principles calculations of Li metal and garnet interface with and without ALD-$Al_2O_3$. The interface model of Li metal on the $LiAl_5O_8$ (a) and the $Li_2CO_3$ (b) from ab initio molecular dynamics simulations. The Li grand potential phase diagram shown the phase equilibria of a LLZO system at different Li chemical potential (c) $\mu_{Li}$=0 eV corresponding to Li metal, and $\mu_{Li}$=−0.06 eV (d) and −1.23 eV (e) corresponding to the range of Li chemical potentials in lithiated alumina.
Figure 11:
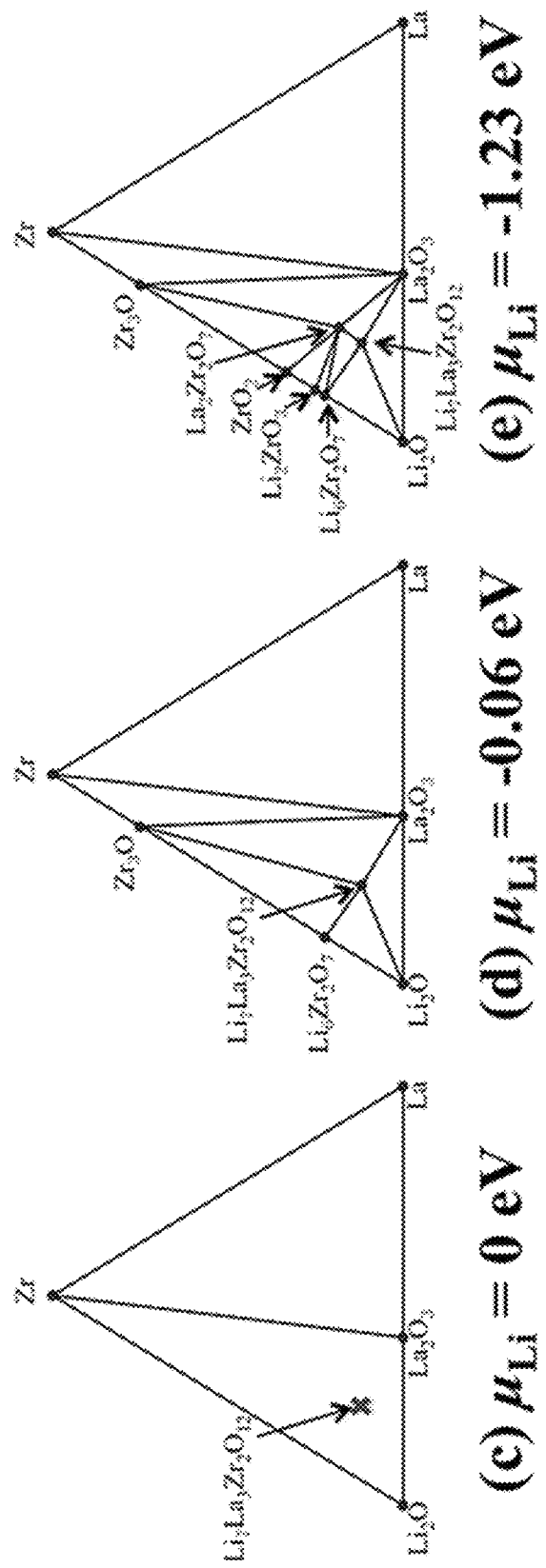

Based on the interface engineering methods disclosed herein, a SSLiB was successfully designed and operated using Li metal anode, garnet electrolyte and a high-voltage cathode. This structure has different interfacial layers for the anode (a metal oxide) and the cathode (polymer/ion-conducting liquid). Electrical properties of the structure are shown in FIG. 11.

Synthesis of $Li_2FeMn_3O_8$ (LFMO). LFMO was synthesized according to the literature with modification. Briefly, glycine-nitrate mixture solution was firstly prepared by dissolving lithium nitrate, iron nitrate, manganese nitrate (2:1:3, mole ratio) and glycine in de-ionized water. The mole ratio of nitrate to glycine is 2:1. Then, the LFMO powder was obtained by combustion reaction of the glycine-nitrate solution at 300° C., followed with a 2-hour annealing at 700° C.

Battery assembly and electrochemical tests. Owing to the sensitivity of Li metal to oxygen and moisture, all the cells including symmetric cells and full cells were assembled and tested in ultrahigh pure argon (99.999%) filled glovebox with moisture and oxygen levels below 0.1 and 0.01 ppm, respectively. In a typical LLCZN/Li assembly, Li foil was pressed to about 0.2 mm, and then punched into thin disks with a diameter 0.79 cm. The thin Li foil disk was spread and gently pressed on ALD-$Al_2O_3$ coated LLCZN pellets at one or both sides with a pair of plastic tweezes. 6 pieces of stainless steel (9 g in total) was put on the Li foil. Then the stacked Li/ALD-$Al_2O_3$ coated LLCZN/Li cell was put in an oven in the glovebox, which was then heated at 250° C. for 1 hour, followed by natural cooling down to room temperature. The LLCZN/Li was then ready to use. The stainless steel was used as the current collector. The cathode disks were made outside the glovebox. The as-synthesized LFMO was thoroughly mixed with carbon black and PVDF at mass ratio of 80:10:10 in NMP (solvent, N-Methyl-2-pyrrolidone). The mixture was then coated on a clean and flat Al foil. After drying in air, the Al foil with cathode slurry coated was put in vacuum oven and further dried overnight at 110° C. It was then punched into cathode disks (diameter of 0.79 cm). The mass measurement was done with a microbalance (Sartorius). The full cells were assembled by putting the cathode disk on the bare side of Li/ALD-$Al_2O_3$-LLCZN pellet with a small amount of high-voltage organic liquid electrolyte added between cathode and LLCZN pellet as the liquid interfacial layer. The assembled cell was fixed using an alligator clip linked with electric cables. The cells were kept in the glovebox during all the tests. The tests were carried with a BioLogic battery tester at room temperature (23–25° C.) via a feedthrough from the glovebox. The cut voltages were 3.5 V and 5.3 V with a current density of 0.1 C (1 C=150 mA/g).

Figure 10:
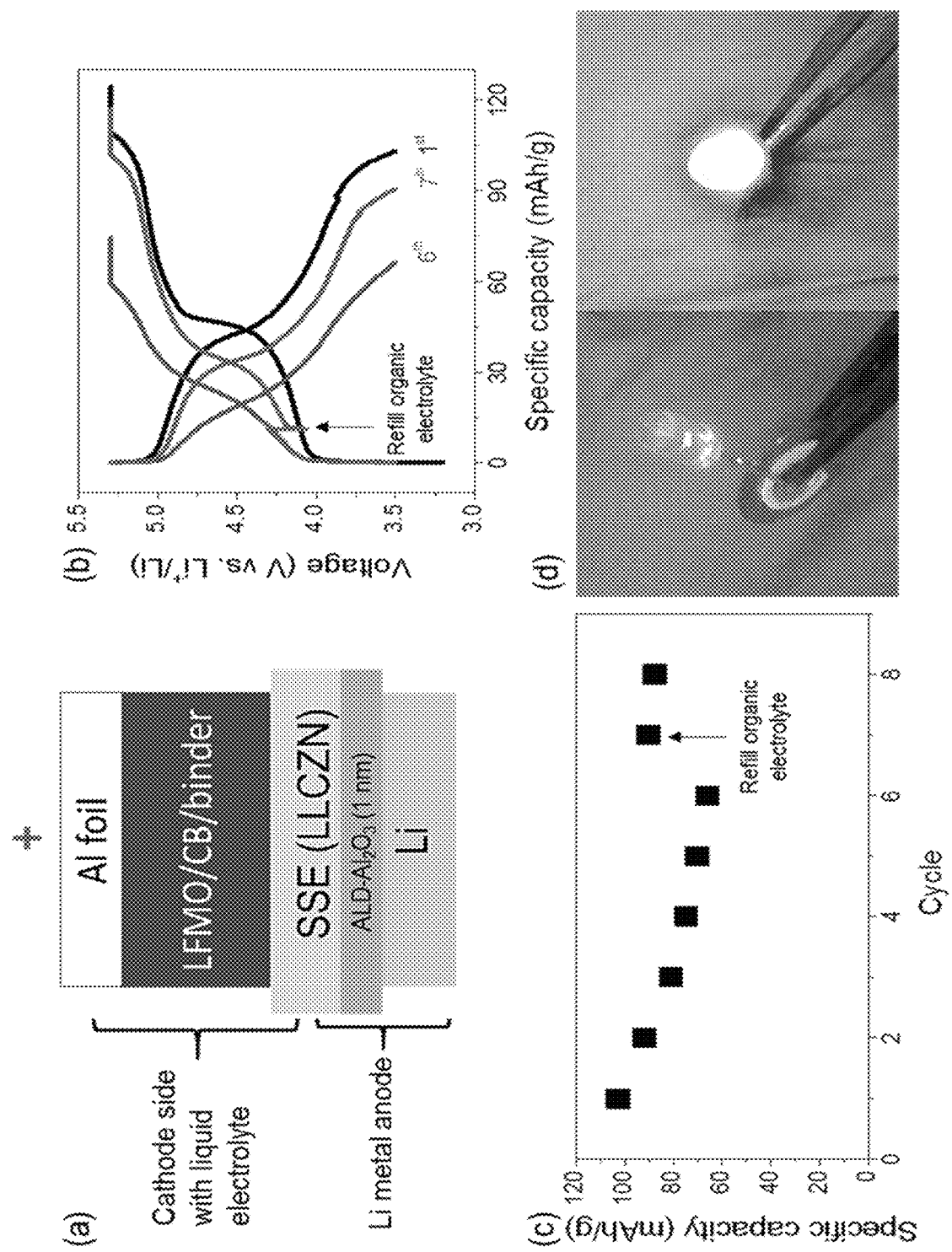
FIG. 10. High-voltage cells with Li metal anode and LLZCN electrolyte. (a) Schematic of the designed full cell using ALD coated LLCZN, Li metal anode, LFMO/carbon black/PVDF composite cathode and a liquid organic electrolyte, with a composition of 1 M $LiPF_6$ in FEC/FEMC/HFE (20:60:20, by volume) added as an interfacial layer between the composite cathode and garnet electrolyte. (b) The 1st, 6th and 7th cycle voltage profiles of the full cell. The arrow indicates where fresh interfacial layer was added. (c) Cycling performance. The arrow indicates the 7th cycle with refilling of fresh liquid interfacial layer. (d) A working cell to light up an LED device. The yellowish pellet in the left photo is the ALD treated LLCZN solid electrolyte. The LED is connected to the cell with assist of plastic tweezers.

Working Cells with Li metal anode and ALD coated LLCZN (e.g., FIG. 10(a)). The effective interface between Li metal anode and the garnet electrolyte developed can potentially enable a range of high-energy density Li-ion batteries. Since garnet electrolyte is stable up to 6V, high-voltage chemistry of $Li_2FeMn_3O_8$ (LFMO) was selected as the cathode material. The cathode electrode, comprising LFMO, carbon black (CB), and polyvinylidene fluoride (PVDF, binder), was made by conventional slurry coating on Al foil. To improve the interface between the cathode composite and the garnet interface, a small amount of liquid organic electrolyte was added to form a cathode/electrolyte interfacial layer. The organic electrolyte, prepared by dissolving 1.0 M $LiPF_6$ in highly fluorinated solvents, is known to be stable up to 4.8 V. The tests were carried out with un-sealed full cells in a glovebox filled with ultrahigh purity argon. FIG. 10(b) presents the voltage profile of the first cycle at 0.1 C (1 C=150 mA/g). Two groups of well-defined plateaus are observed at 4.0 V and 4.9 V for discharge and 4.1 V and 5.0 V for charge, validating the working full cell, and as well an Li metal anode with a small over-potential (0.1 V). The cell delivers a capacity of 103 mAh/g (70% theoretical specific capacity of LFMO) with Columbic efficiency of 83% in the first cycle. For the next five cycles the capacity gradually decayed (FIG. 10(c)), which is due to the evaporation of the volatile organic solvents in the interfacial layer. Nevertheless, the sixth cycles still showed specific plateaus of LFMO (FIG. 10(b)). The cell test was paused after the sixth cycle and restarted after refilling with fresh organic electrolyte for the interfacial layer. As expected, the cell immediately recovered and the capacity increased to 87% of the original value with well-defined charge/discharge plateaus (FIG. 10(b),(c)). FIG. 10(d) shows the photographs of working cells, which power a light emitting diode (LED).

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. An interfacial layer and solid-state electrolyte (SSE) combination comprising:
   an interfacial layer that is an inorganic interfacial layer;
   an anode material; and
   a sintered solid-state electrolyte (SSE) material comprising pores,
   wherein the inorganic interfacial layer is a metal oxide selected from $Al_2O_3$, $TiO_2$, $V_2O_5$, $Y_2O_3$, and combinations thereof or a lithiated metal oxide selected from $Al_2O_3$, $TiO_2$, $V_2O_5$, $Y_2O_3$, and combinations thereof, and has a thickness of 1 nm to 100 nm, and is in contact with at least a portion of the SSE material and the anode material within the pores, and the interfacial layer increases contact between the SSE material and the anode material.

2. The interfacial layer and SSE combination of claim 1, wherein the SSE material comprises one or more lithium-ion conducting SSE material selected from lithium perovskite materials, $Li_3N$, Li-β-alumina, Lithium Super-ionic Conductors (LISICON), $Li_{2.88}PO_{3.86}N_{0.14}$ (LiPON), $Li_9AlSiO_8$, $Li_{10}GeP_2S_{12}$, lithium garnet SSE materials, doped lithium garnet SSE materials, lithium garnet composite materials, and combinations thereof.

3. The interfacial layer and SSE combination of claim 1, wherein the SSE material comprises a sodium-ion conducting SSE material selected from $β''-Al_2O_3$, $Na_4Zr_2Si_2PO_{12}$ (NASICON), cation-doped NASICON, and combinations thereof.

4. The interfacial layer and SSE combination of claim 1, wherein the SSE material is a magnesium-ion conducting SSE material selected from, NASICON-type magnesium-ion conducting materials and combinations thereof.

5. The interfacial layer and SSE combination of claim 1, wherein an initial contact of the anode material within the pores is by the anode material in a molten form contacting the inorganic interfacial layer, and wetting a surface of the pores where the inorganic interfacial layer is present.

6. The interfacial layer and SSE combination of claim 1, wherein the inorganic interfacial layer is $Al_2O_3$.

7. The interfacial layer and SSE combination of claim 6, wherein the interfacial layer has a thickness of 1 nm to 20 nm.

8. The interfacial layer and SSE combination of claim 1, wherein the pores form a continuous porous structure.

9. The interfacial layer and SSE combination of claim 8 wherein the continuous porous structure is a series of interconnected pores.

10. The interfacial layer and SSE combination of claim 9, wherein the inorganic interfacial layer is a lithiated metal oxide of $Al_2O_3$.

11. A device comprising one or more of the interfacial layer and SSE combinations of claim 1.

12. The device of claim 11, wherein the device is a solid-state ion-conducting battery and the device further comprises a cathode material.

13. The device of claim 12, wherein the solid-state ion conducting battery further comprises a cathode-side current collector and/or an anode-side current collector.

14. The device of claim 12, wherein the interfacial layer, the SSE material, cathode material, anode material, and one or more current collectors form a cell, and the solid-state, ion-conducting battery comprises a plurality of the cells, each adjacent pair of the cells is separated by a bipolar plate.

15. The device of claim 12, wherein the solid-state ion conducting battery exhibits reduced interfacial resistance relative to a same ion-conducting battery that does not have the inorganic interfacial layer.

16. The device of claim 15, wherein the ion-conducting battery exhibits 750 Ω·$cm^2$ or less interfacial resistance.

17. The device of claim 12, wherein the solid-state ion-conducting battery is a lithium-ion conducting solid-state battery and the SSE material comprises one or more lithium-ion conducting SSE material selected from lithium perovskite materials, $Li_3N$, Li-β-alumina, Lithium Super-ionic Conductors (LISICON), $Li_{2.88}PO_{3.86}N_{0.14}$ (LiPON), $Li_9AlSiO_8$, $Li_{10}GeP_2S_{12}$, lithium garnet SSE materials, doped lithium garnet SSE materials, lithium garnet composite materials, and combinations thereof.

18. The device of claim 17, wherein the cathode material is selected from a lithium-containing cathode materials, conducting carbon materials that, optionally, further comprise an organic or gel ion-conducting electrolyte, and polysulfide materials and/or the anode material is selected from lithium metal, silicon, conducting carbon materials that, optionally, further comprise an organic or gel ion-conducting electrolyte, and air.

19. The device of claim 12, wherein the solid-state ion-conducting battery is a sodium-ion conducting solid-state battery and the SSE material comprises a sodium-ion conducting SSE material selected from β''-Al$_2$O$_3$, Na$_4$Zr$_2$Si$_2$PO$_{12}$ (NASICON), cation-doped NASICON, and combinations thereof.

20. The device of claim 19, wherein the cathode material is selected from sodium-containing cathode materials, sulfur, sulfur composite materials, and polysulfide materials and/or the anode material is selected from ion-conducting, sodium-containing anode materials, sodium metal, tin, phosphorus, and air.

21. The device of claim 12, wherein the solid-state ion-conducting battery is a magnesium-ion conducting solid-state battery and the SSE material is a magnesium-ion conducting SSE material selected from, NASICON-type magnesium-ion conducting materials and combinations thereof.

22. The device of claim 21, wherein the cathode material is a magnesium-containing cathode material and/or the anode material is magnesium metal.

23. An interfacial layer and solid-state electrolyte (SSE) combination comprising:

an interfacial layer that is an inorganic interfacial layer;

an anode material; and a sintered solid-state electrolyte (SSE) material comprising pores, wherein the inorganic interfacial layer is a metal oxide selected from Al$_2$O$_3$, TiO$_2$, V$_2$O$_5$, Y$_2$O$_3$, and combinations thereof has a thickness of 1 nm to 100 nm, and is in contact with at least a portion of the SSE material and the anode material within the pores, and the interfacial layer increases contact between the SSE material and the anode material.

* * * * *